US008448716B2

(12) United States Patent
Yoshida

(10) Patent No.: US 8,448,716 B2
(45) Date of Patent: May 28, 2013

(54) FIRE EXTINGUISHER GAS EJECTOR

(76) Inventor: Hideo Yoshida, Tokorozawa (JP)

( * ) Notice: Subject to any disclaimer, the term of this patent is extended or adjusted under 35 U.S.C. 154(b) by 793 days.

(21) Appl. No.: 12/597,806

(22) PCT Filed: Sep. 25, 2008

(86) PCT No.: PCT/JP2008/002650
§ 371 (c)(1),
(2), (4) Date: Oct. 27, 2009

(87) PCT Pub. No.: WO2009/050847
PCT Pub. Date: Apr. 23, 2009

(65) Prior Publication Data

US 2010/0132967 A1 Jun. 3, 2010

(30) Foreign Application Priority Data

Oct. 19, 2007 (JP) ................................. 2007-272507

(51) Int. Cl.

| | |
|---|---|
| ***A62C 13/00*** | (2006.01) |
| ***A62C 3/07*** | (2006.01) |
| ***A62C 37/50*** | (2006.01) |
| ***B67D 1/00*** | (2006.01) |
| ***F16K 17/14*** | (2006.01) |

(52) U.S. Cl.
USPC ................... 169/72; 169/62; 169/71; 169/75; 222/82; 222/83; 137/68.3

(58) Field of Classification Search
USPC ................ 169/62, 71, 72, 75, 77, 89; 222/82, 222/83; 137/68.3
See application file for complete search history.

(56) References Cited

U.S. PATENT DOCUMENTS

| | | | | |
|---|---|---|---|---|
| 2,558,409 | A | 6/1951 | Allen | |
| 2,778,435 | A | 1/1957 | Downham et al. | |
| 3,010,520 | A * | 11/1961 | Seaberg | 169/77 |
| 4,862,968 | A * | 9/1989 | Woodman | 169/75 |
| 5,615,743 | A * | 4/1997 | Matsumoto et al. | 169/74 |
| 5,704,428 | A * | 1/1998 | Asano | 169/74 |
| 6,637,450 | B2 * | 10/2003 | Huang | 137/68.3 |
| 7,051,391 | B2 * | 5/2006 | Wang | 7/158 |
| 7,703,640 | B1 * | 4/2010 | Hollars et al. | 222/5 |
| 2008/0245282 | A1 | 10/2008 | RIchards | |

FOREIGN PATENT DOCUMENTS

| | | |
|---|---|---|
| JP | 48-82798 | 10/1973 |
| JP | 48-107296 | 12/1973 |
| JP | 52-164397 | 12/1977 |
| JP | 55-56660 | 4/1980 |
| JP | 57-163258 | 10/1982 |
| JP | 3007514 | 11/1994 |
| JP | 9-103512 | 4/1997 |
| JP | 11-11241 | 1/1999 |
| JP | 2873001 | 1/1999 |
| JP | 2890097 | 2/1999 |
| JP | 2006-333892 | 12/2006 |
| JP | 2007-137312 | 6/2007 |
| JP | 2007-181902 | 7/2007 |
| WO | WO-2006/102713 | 10/2006 |

* cited by examiner

*Primary Examiner* — Ryan Reis
(74) *Attorney, Agent, or Firm* — Jordan and Hamburg LLP

(57) ABSTRACT

For an automobile there is provided a fire extinguisher which is rapidly activatable in combination with a device for cutting a seatbelt and a device for breaking open a windshield.

24 Claims, 23 Drawing Sheets

Ｆｉｇ．１６
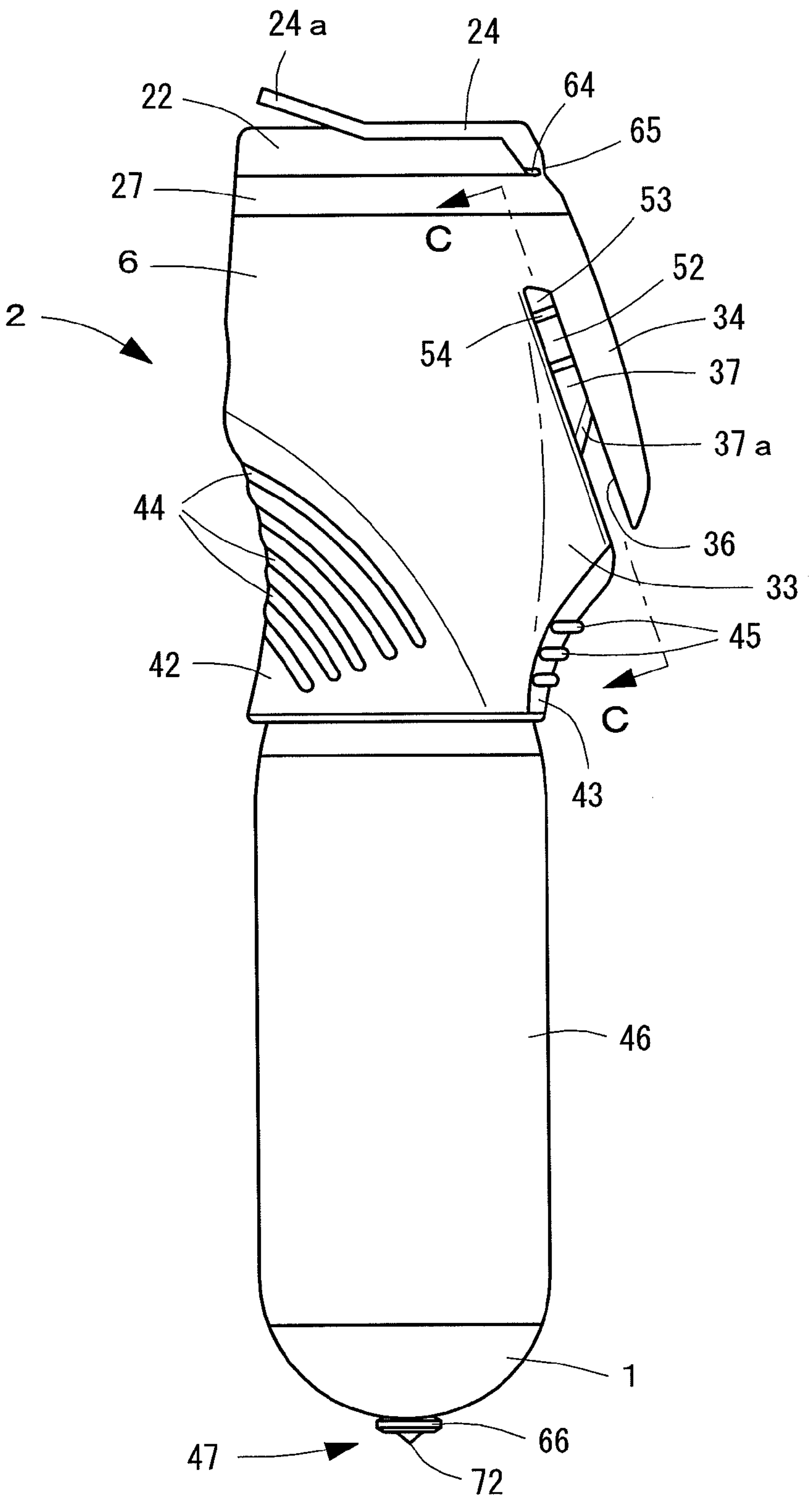

FIRE EXTINGUISHER GAS EJECTOR

BACKGROUND OF THE INVENTION

The present invention is suitable for a fire extinguisher gas ejector. This invention relates to an fire extinguisher gas ejector comprising a safety member which can be taken out easily and promptly so that a seal of a loaded small gas cylinder can be quickly pierced, whereupon a jet of an extinguishing gas is promptly emitted, for an early fire extinction. The invention also comprises a device for an emergency escape from a vehicle, which device cuts a seat belt promptly and breaks a windshield reliably in such event as a fire in the vehicle or collision, to facilitate prompt escape from the vehicle. Thus, a device exclusive to escape is unnecessary. Devices for fire extinguishing and escaping are thereby constituted rationally. The invention also comprises a control valve which prevents a waste of the extinguishing gas after the seal is pierced and jets the fire extinguishing gas to a fire origin surely and accurately in fire fighting.

Popular fire extinguishers placed at homes or offices are usually large-sized and heavy so that they require physical strength and are hard to use.

To solve above-mentioned problems, a variety of small and lightweight fire extinguishers that can be used simply have been proposed.

For example, of the simple fire extinguishers, a gas cylinder is disposed in a pipe body, a cover is put thereon, a plate-shaped nozzle forming a jetting port at the lower end is attached, a pusher guide is attached on the top of the pipe body, and a pusher having a needle on the guide is attached slidably. A cylinder receiver is attached inside of the pusher guide, and a screw of the mouth part of the gas cylinder is screwed up for the receiver. Usually, a safety plate is plugged in the pusher to stop movement thereof.

Then, the safety plate is removed for putting out a fire and the outside of the pusher is pressed with a hand and pushes inwardly. Then a sealing plate is pierced by the needle which moves toward the gas cylinder side. The gas which gushes from the cylinder is guided to inside of a shaft from the inside of the pipe so as to jet the gas from a jetting port which is positioned at the opposite side with the seal piercing position. (For example, see, Patent Document 1)

However, the above-mentioned fire extinguisher has following problems. An operation of the safety plate may be confusing when putting out a sudden fire and small grasping portion makes it difficult to pull out the safety plate. After the seal is pierced, the jetting gas is guided to a space between the pipe body and the gas cylinder. Since the gas is jetted from the jetting port which is positioned at the opposite side of the seal piercing point, pressure, speed and an effect in fire fighting is attenuated, making initial fire fighting incomplete. Moreover, the jetting gas remains inside of the pipe body after the seal piercing so that some amount of gas remains unused in the pipe body.

On the other hand, the conventional simple fire extinguishers are usually placed at homes or offices, however, the demands to place them in vehicles is on the rise to cope with a fire in vehicles nowadays.

In such cases, it is to be desired for a simple fire extinguisher used in a vehicle to combine other functions rationally in addition to the function of a fire extinguisher.

Due to such demands recently, it has been proposed to equip a car with an emergency escape device so as to be able to escape from a car in case of an emergency, such as collision.

The escape device is formed in shape of a bar and is provided with a cutter for cutting a seat belt at one end. A hammer capable of breaking a windshield is provided at the other end or the same end and the device is set in a holder. It is installed adjacent a driver's seat or other appropriate place in a car to prepare for an emergency. (For example, see, patent documents 2 and 3.)

One such emergency escape device is inconvenient for emergency use because a cutter has to be extracted from its storage handle. Another such emergency escape device has following problem. The cutter is arranged with the edge fixed downwardly in a generally V-shaped groove between a periphery of a body and a guide which protrudes toward a head part of the body. When cutting a seat belt, a side of the seat belt contacts the edge of the cutter at generally right angles. Therefore, the seat belt cannot be cut promptly and smoothly.

Patent Document 1: Japanese Patent Publication No. 2890097

Patent Document 2: Utility Model Registration No. 3007514

Patent Document 3: Japanese Patent Publication No. 2873001

SUMMARY OF THE INVENTION

It is an object of the present invention to solve the mentioned problem and provide a fire extinguisher gas ejector which is suitable for a fire extinguisher used in car. This invention provides a fire extinguisher gas ejector in which the safety member is easily and quickly removed for piercing the seal of the charged small gas cylinder and jetting the gas properly for early fire extinction. This invention also comprises a device for emergency escape from a vehicle, which device cuts a seat belt promptly and breaks the windshield reliably in such event as a fire in the vehicle or a collision, and facilitates a prompt escape from the vehicle. The escape device can rationally and safely be attached to the gas cylinder. The invention includes a control valve which prevents a waste of the extinguishing gas and jets the fire extinguishing gas to an origin of a fire surely and accurately in fire fighting.

The present invention in a first aspect thereof comprises a gas cylinder filled with extinguishing gas, sealed with a seal and provided with a mouth part removably attached thereto;

a cylinder holder formed therein with a through hole and a nozzle hole;

a piercing pipe which is slidably mounted onto the cylinder holder, biased to upwardly move, and provided at one end thereof with a tip part capable of piercing the seal;

a piercing member coupling with the other end of the piercing pipe;

a safety member capable of restraining an operation of the piercing pipe; and a control valve movably provided in a communicating passage between the through hole and the nozzle hole to be able to block the communication passage by a move of the control valve. The control valve stops emitting of the extinguishing gas from the gas cylinder after the seal is pierced. In addition, it prevents a waste of extinguishing gas and enables jetting of the gas to an origin of a fire accurately. Therefore, effective use of the extinguishing gas and initial fire fighting can be achieved. Moreover, the structure is simplified by reducing the number of the parts so that a small and lightweight fire extinguisher gas ejector can be produced easily and at low cost.

In a second aspect of the present invention, the through hole has a small-caliber valve hole and the valve hole is slidably provided with the control valve. The gas cylinder is structured rationally to attempt to reduce a number of parts and to make a structure of the control valve simpler. Thus, it is produced easily and at a low cost.

In a third aspect of the present invention, the control valve has a periphery on which at least two O-rings are mounted apart from each other, the valve hole is air-tightened with one of the O-rings, before or when the seal is pierced by the piercing pipe, and either one of the O-rings is positioned at an inner opening of the nozzle hole to be able to close the nozzle hole, thereby making the constitution of the control valve simpler. The extinguishing gas which jets from the nozzle hole before/when piercing the seal is prevented and a waste of the extinguishing gas is stopped.

In a fourth aspect of the present invention, the piercing pipe is returned to an original position under pressure of the extinguishing gas jetted from the gas cylinder, and one of the O-rings is positioned at the inner opening of the nozzle hole to be able to close the nozzle hole. Then, after the seal is pierced, the extinguishing gas which uselessly jets can be stopped and a waste of the extinguishing gas is prevented.

In a fifth aspect of the present invention, the extinguishing gas released from the gas cylinder is able to stagnate in the through hole after the seal is pierced, thereby preventing a waste of the extinguishing gas.

In a sixth aspect of the present invention, the closed nozzle hole is unclosed with one of the O-rings by an operation of the piercing pipe after the seal is pierced, thereby allowing the extinguishing gas to be jetted from the nozzle hole. After the seal is pierced, when the piercing pipe is pressed with the piercing member, the extinguishing gas is jetted.

In a seventh aspect of the present invention, the piercing pipe has a lower part exhibiting a less descending displacement after the seal is pierced than when the seal is pierced. When the piercing member is operated after the piercing, the tip part of the piercing pipe is inserted to the opening of the sealing plate to prevent a situation which interferes with a smooth jetting of the extinguishing gas.

In an eighth aspect of the present invention, the safety member is arranged just below the piercing member to be able to be pulled out laterally, and the safety member which is formed integrally with a tab is arranged on the piercing member to be able to be pulled up. The safety member can be removed immediately, simply, and smoothly for emergency use.

In a ninth aspect of the present invention, the safety member is formed in a shape of a plate or ring. When the shape is a plate, stability is obtained when placing the piercing member. When the shape is a ring, the safety member is smaller and lighter and the safety member can be pulled out more quickly.

The present invention in a tenth aspect thereof comprises a gas cylinder filled with extinguishing gas, sealed with a seal and provided with an exposed bottom and a mouth part removably attached thereto;

a cylinder holder formed therein with a through hole and a nozzle hole;

a piercing pipe which is slidably mounted onto the cylinder holder, biased upwardly to move, and provided at one end thereof with a tip part capable of piercing the seal;

a piercing member coupling with the other end of the piercing pipe;

a safety member capable of restraining an operation of the piercing pipe;

and a hammer having a pointed part and attached to the exposed bottom of the cylinder.

In case of an emergency such as fire on vehicle or collision, a windshield can be broken by the hammer to facilitate escape from a vehicle quickly. Further, by installing a device for escaping with the fire extinguisher in a vehicle, a device which is exclusive to escape becomes unnecessary. Devices for both fire extinguishing and escaping can thereby be attained rationally.

The present invention in an eleventh aspect thereof comprises the hammer attached to the gas cylinder which is filled with the extinguishing gas. By not charging the extinguishing gas to the gas cylinder until after the hammer is attached, conventional facilities or operations for filling the gas are utilized and improvement of productivity and efficiency is realized.

The present invention in a twelfth aspect thereof comprises the hammer having a retaining ring attached to the exposed bottom of the gas cylinder and a hammer shaft that has a neck hooked to an inside of the retaining ring and the pointed part protruded outside the retaining ring. The hammer is structured with two members and the plating for the gas cylinder and the retaining ring is carried out after attaching the retaining ring. When plating the gas cylinder after attaching the hammer shaft, damage to the surface of the gas cylinder by the pointed part of the hammer shaft is prevented, and the hammer is attached rationally.

In a thirteenth aspect of the present invention, after the retaining ring is attached to the gas cylinder, the retaining ring and the gas cylinder are plated so that the plating for the retaining ring and the gas cylinder is performed safely and rationally.

In a fourteenth aspect of the present invention, the neck of the hammer shaft has an elastic stopper mounted thereon, and the stopper is arranged to engage with an inner opening of the retaining ring so that the hammer shaft is attached to the retaining ring securely.

The present invention in a fifteenth aspect thereof comprises an outer shell provided outside the cylinder holder, the seat belt introduction groove provided in a periphery of the outer shell for insertion of a seat belt therein, and a cutter arranged to face the seat belt introduction groove. In case of an emergency such as a fire in a vehicle or collision, the seat belt can be cut smoothly, enabling prompt escape from a vehicle. Further, by installing a device for cutting a seat belt on the fire extinguisher installed in a vehicle, a device exclusive for escape becomes unnecessary. The mechanism of both fire extinguishing and escaping can be structured rationally.

In a sixteenth aspect of the present invention, the seat belt introduction groove is arranged on the opposite side of the nozzle hole so that the extinguishing gas is jetted from the nozzle hole surely and introduction and cutting of the seat belt is performed surely.

In a seventeenth aspect of the present invention, the cutter is provided with a seat belt releasing part at inner side position, which moves the cut seat belt backward smoothly and speedily. Thus, the cutting can be carried out smoothly by pushing and spreading the cut part.

In an eighteenth aspect of the present invention, the seat belt releasing part is integrally formed with the outer shell. Therefore, the seat belt releasing part is produced easily and homogeneously.

In a nineteenth aspect of the present invention, the seat belt releasing part has a substantially inverted triangular cross-section taken along a direction of introducing the seat belt in the seat belt introduction groove so that the cutting can be carried out smoothly by spreading and moving the cut part of the seat belt.

In a twentieth aspect of the present invention, the seat belt releasing part is provided in a vicinity of a rear of the cutter and has a distal end insertable in a cut part of the seat belt, and releasing surfaces formed on opposite sides thereof to continue with the distal end for spreading and moving the cut part of the seat belt. Thus, spreading and smooth moving of the cut part are promoted.

In a twenty first aspect of the present invention, the outer shell is provided on a lower periphery thereof with curved concave parts disposed apart from an upper periphery of the gas cylinder. Owing to this arrangement, the fire extinguisher is easily grasped, conductive heat to the curved concave parts is prevented via spaces, and effect of low heat when the extinguishing gas is jetted can be avoided.

In a twenty second aspect of the present invention, the curved concaved parts are disposed on front and back sides of the lower periphery of the outer shell and have a plurality of concavo-convex parts for easy and strong grasping of the fire extinguisher.

The present invention in a twenty third aspect thereof comprises a piercing device loaded with the gas cylinder, a storing case accommodated in a door pocket of a car for storing the piercing device, a strap having opposite ends thereof attached to a periphery of the storing case, a middle part thereof provided with a stopper that is detachably attached to an engaging part buried in an outer surface of the door pocket, and a leading end thereof stuck out to face a driver side. Owing to this arrangement, the storing case for the piercing member is stably accommodated in a door pocket. When in use, the leading end is grasped and pulled, and then the storing case is removed easily for an immediate use.

The present invention in a twenty fourth aspect thereof comprises a piercing device loaded with the gas cylinder and a protective case installed at an appropriate place in a car for storing the piercing device and formed with upper and lower opening facing in opposite directions, wherein the seat belt introduction groove and piercing member emerge at the upper opening, whereas a periphery of the gas cylinder emerges at the lower opening. Upper and lower opening loosen close contact with the piercing device so that the piercing device can be taken out immediately. A seat belt can be cut with a state in which the piercing device is stored in a protective case. Moreover, an open hole is formed at the corresponding position with the nozzle hole which is located the opposite side of the upper opening so that the jetting of the extinguishing gas can be realized.

In the first aspect of the present invention, the communicating passage between the through hole and the nozzle hole is movably provided with the control valve and the move of the control valve is able to intermit the commutation passage. The control valve stops emitting the extinguishing gas from the gas cylinder after the seal is pierced. In addition, it prevents a waste of extinguishing gas and enables to jet the extinguishing gas to an origin of a fire. Therefore, effective use of the extinguishing gas and initial fire fighting can be achieved. Moreover, the structure is simplified by reducing the number of the parts. It is small and lightweight and it can be produced easily and at low cost.

In the second aspect of the present invention, the through hole has a small-caliber valve hole and the valve hole is slidably provided with the control valve. The gas cylinder is constituted rationally so that the number of parts is reduced, making the constitution of the control valve simpler. Thus, it is produced easily and at a low cost.

In the third aspect of the present invention, the control valve has a periphery on which at least two O-rings are mounted apart from each other, the valve hole is air-tightened with one of the O-rings, before or when the seal is pierced by the piercing pipe, either one of the O-rings is positioned at an inner opening of the nozzle hole to be able to close the nozzle hole, thereby making the constitution of the control valve simpler. The extinguishing gas which jets from the nozzle hole before/when piercing the seal is prevented and a waste of the extinguishing gas is also prevented.

In the fourth aspect of the present invention, the piercing pipe is returned to an original position under pressure of the extinguishing gas jetted from the gas cylinder, and one of the O-ring is positioned at the inner opening of the nozzle hole to be able to close the nozzle hole. Accordingly, after the seal is pierced, the extinguishing gas which unconsciously jets can be stopped and a waste of the extinguishing gas is also prevented.

In the fifth aspect of the present invention, the extinguishing gas jetted from the gas cylinder is able to be stagnated in the through hole after the seal is pierced, thereby preventing a waste of the extinguishing gas.

In the sixth aspect of the present invention, the closed nozzle hole is unclosed with one of the O-rings by the operation of the piercing pipe after the seal is pierced, thereby allowing the extinguishing gas to be jetted from the nozzle hole. After the seal is pierced, the piercing pipe is pressed down with the piercing member and the extinguishing gas is gushed.

In the seventh aspect of the present invention, the piercing pipe has a lower part exhibiting a less descending displacement after the seal is pierced than when the seal is pierced. When the piercing member is operated after the piercing, the tip part of the piercing pipe is inserted to the opening of the sealing plate to prevent a situation which interferes a smooth jetting of the extinguishing gas.

In the eighth aspect of the present invention, the safety member is arranged just below the piercing member to be able to be pulled out laterally, and the tab which is integrally formed with the safety member is able to be pulled up. Owing to this arrangement, the safety member can be removed immediately, simply, and smoothly to be able to cope with an emergency use.

In the ninth aspect of the present invention, the safety member is formed in a shape of a plate or ring. When the shape is a plate, stability is obtained when placing the piercing member. When the shape is a ring, the safety member is smaller and lighter. In addition, the safety member can be pulled out more quickly.

In the tenth aspect of the present invention, a hammer having a pointed part is attached to the exposed bottom of the cylinder. In case of an emergency such as fire in vehicle or collision, a windshield can be broken by the hammer and attempt escape from a vehicle. In case of an emergency such as fire on vehicle or collision, a windshield can be broken by the hammer and attempt to escape from a vehicle quickly. Further, by installing a mechanism of escaping with the fire extinguisher in vehicle, a device exclusive to escape becomes unnecessary. Mechanisms for both fire extinguishing and escaping are constituted rationally.

The present invention in the eleventh aspect thereof comprises the hammer attached to the gas cylinder after filling with the extinguishing gas. Without charging the extinguishing gas to the gas cylinder after the hammer is attached, conventional facilities or operations for filling the gas are utilized and improvement of productivity and efficiency is realized.

The present invention in the twelfth aspect thereof comprises the hammer having a retaining ring attached to the exposed bottom of the gas cylinder, a hammer shaft that has a neck hooked to an inside of the retaining ring, and the pointed part protruded outside the retaining ring. The hammer is made structured with two members and plating for gas cylinder and the retaining ring is carried out after attachment of the retaining ring. When plating the gas cylinder after attaching the hammer shaft, damage to the surface of the gas cylinder is prevented and the hammer is attached rationally.

In the in the thirteenth aspect of the present invention, after the retaining ring is attached to the gas cylinder, the retaining ring and the gas cylinder are plated so that the plating for the retaining ring and the gas cylinder is performed safely and rationally.

In the fourteenth aspect of the present invention, the neck of the hammer shaft has an elastic stopper mounted thereon, and the stopper is arranged to engage with an inner opening of the retaining ring so that the hammer shaft is attached to the retaining ring securely.

The present invention in the fifteenth aspect thereof comprises an outer shell provided outside the cylinder holder, a seat belt introduction groove provided in a periphery of the outer shell and capable of inserting a seat belt therein, and a cutter arranged to face the seat belt introduction groove. In case of an emergency such as fire in vehicle or collision, a seat belt can be cut smoothly and attempt to escape from a vehicle quickly. Further, by installing a mechanism of cutting the seat belt with the fire extinguisher in vehicle, an exclusive escaping device becomes unnecessary. Mechanisms of both fire extinguishing and escaping can be attained rationally.

In the sixteenth aspect of the present invention, the seat belt introduction groove is arranged on opposite side of the nozzle hole so that the extinguishing gas is jetted from the nozzle hole surely. Further, introduction and cutting of the seat belt is performed surely.

In the seventeenth aspect of the present invention, the cutter is provided therein with a seat belt releasing part, which backwardly moves the cut seat belt smoothly and speedily so that the cutting can be carried out smoothly by pushing and spreading the cut part.

In the eighteenth aspect of the present invention, the seat belt releasing part is integrally formed with the outer shell. Therefore, the seat belt releasing part is produced easily and homogeneously.

In the nineteenth aspect of the present invention, the seat belt releasing part has a substantially inverted triangular cross-section taken along a direction of introducing the seat belt in the seat belt introduction groove so that the cutting can be carried out smoothly by spreading and moving the cut part of the seat belt.

In the twentieth aspect of the present invention, the seat belt releasing part is provided in a vicinity of a rear of the cutter and has a distal end insertable in a cut part of the seat belt, and releasing surfaces formed on opposite sides thereof to continue with the distal end for spreading and moving the cut part of the seat belt. Thus, spreading and smooth moving of the cut part are promoted.

In the twenty first aspect of the present invention, the outer shell is provided on a lower periphery thereof with curved concave parts disposed apart from an upper periphery of the gas cylinder. Owing to this arrangement, the fire extinguisher is easily grasped, conductive heat to the curved concave parts is prevented via spaces, and effects of low heat when the extinguishing gas is jetted can be avoided.

In the twenty second aspect of the present invention, the curved concave parts are disposed on front and back sides of the lower periphery of the outer shell and have a plurality of concavo-convex parts for easy and strong grasping of the fire extinguisher.

The present invention in the twenty third aspect thereof comprises the piercing device loaded with the gas cylinder, a storing case accommodated in a door pocket of a car for storing the piercing device, a strap having opposite ends thereof attached to a periphery of the storing case, a middle part thereof provided with a stopper that is detachably attached to an engaging part buried in an outer surface of the door pocket, and a leading end thereof stuck out to face a driver side. Owing to this arrangement, the storing case for the piercing member is stably accommodated in a door pocket. When in use, the leading end is grasped and pulled, and then the storing case is removed easily for an immediate use.

The present invention in the twenty fourth aspect thereof comprises a piercing device loaded with the gas cylinder and a protective case installed at an appropriate place in a car for storing the piercing device and formed with upper and lower opening facing in opposite directions, wherein the seat belt introduction groove and piercing member emerge at the upper opening, whereas a periphery of the gas cylinder emerges at the lower opening. Upper and lower opening loosen close contact with the piercing device so that the piercing device can be taken out immediately. A seat belt can be cut with a state stored in a protective case. Moreover, an open hole is formed at the corresponding position with the nozzle hole which is located the opposite side of the upper opening so that the jetting of the extinguishing gas can be realized.

BRIEF DESCRIPTION OF THE DRAWINGS

FIG. 16 is a front view of a third embodiment showing that the other embodiments of the seat belt introduction groove and the hammer.

DETAILED DESCRIPTION OF THE INVENTION

Figure 1:
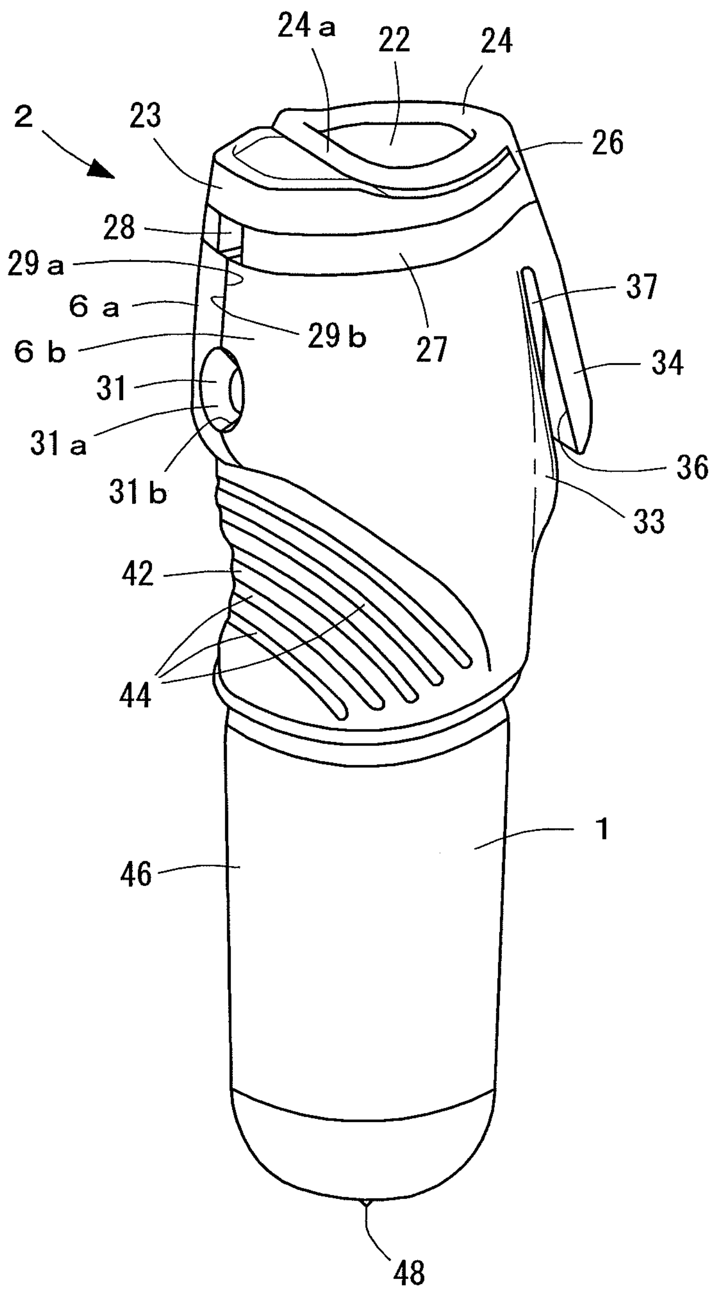
FIG. 1 is a perspective view of a first embodiment of the present invention showing the piercing device attached to the gas cylinder.

The following is description of illustrated embodiments that this invention is applied to a fire extinguisher gas ejector for in-car use which uses a cartridge gas cylinder. In FIGS. 1 to 14, reference numeral 1 represents a known and small gas cylinder which is charged with carbon dioxide as an extinguishing gas. A mouth part of the gas cylinder 1 is provided with a piercing device 2.

The gas cylinder 1 of the embodiment requires about 40 mm in external diameter, about 130 mm in length, and about 90 ml in tare weight and is charged with carbon dioxide of about 4 MPa therein. The weight after charging is about 300 g. After charging the gas, the mouth part is sealed with the sealing plate 3 and a hammer, which is described later, is attached to a bottom.

A thread part 4 is formed on a periphery of the mouth part for the gas cylinder 1 and is screwed to the piercing device 2 to be fixed.

The seal piercing device 2 is formed in irregular tubular shape with strong and light synthetic resin. The seal piercing device 2 is composed of double pipes. One is a cylinder holder 5 which has a lower end capable of being screwed onto the thread part 4. The other is an outer pipe or shell 6, which has a hollow tubular shape and is arranged outside of the cylinder holder 5.

The cylinder holder 5 is made of aluminum and is of virtually cylindrical shape and has an internally threaded opening 7 at the lower end capable of being screwed onto the thread part 4.

The cylinder holder 5 has a through hole 8 which communicates with the opening 7 and a hole 9 which is a little smaller than the through hole 8 therein for communication therebetween in the coaxial direction. The seal piercing pipe 10, which will be described later, is inserted slidably the through hole 8 and the hole 9.

In the illustration, reference numerals 11 and 12 represent O-rings. The O-ring 11 is inserted at a step between the through hole 8 and the hole 9. The O-ring 12 is inserted in a annular groove between the screw hole 7 and the through hole 8.

The middle to upper periphery of the cylinder holder 5 has a jetting port 13 which constitutes a jetting flow path together with the through hole 8 and a nozzle hole, which will be described later. A nozzle hole 14, which communicates with the through hole 8, is formed in the inner part of the jetting port 13.

A pair of positioning pins 15 is protruded from the outer periphery of the cylinder holder 5 to the diameter direction and the pins 15 are fitted to the pin holes that are formed on inner surfaces of outer pipe pieces, which will be described later. Outer pipe pieces 6*a*, 6*b* are connected to predetermined positions to prevent dislocation of guide holes 31*a*, 31*b*, connecting surfaces 38*a*, 38*b*, and recessed grooves 38*a*, 38*b*.

In this embodiment, a pair of recess holes 16 are formed at the positions of 90 degree from the jetting port 13 on the periphery of the cylinder holder 5. The positioning pins 15 are pressed in the recess holes 16 and the ends are protruded from the periphery.

The piercing pipe 10 is formed in a shape of bar by processing aluminum bar. The upper half of the piercing pipe 10 is slidably inserted to the hole 9 and a large-diameter part 10*a* is formed on the middle part. The large-diameter part 10*a* is slidably inserted to the through hole 8. In drawings, reference numeral 17 is an annular groove formed on the large-diameter part 10*a*. Reference numeral 18, which is an O-ring, is attached to the annular groove 17.

A needle tube 19, which is made of steel tube, is fixed to the lower end of the seal piercing pipe 10 and the end of 19 is diagonally cut permitting the tip part 19*a* to pierce the sealing plate 3.

In this case, without providing the seal piercing pipe 10 and the needle tube 19 separately, these parts can be integrally constituted. Then, a number of parts are reduced and the structure becomes simpler. Accordingly, the piercing pipe 10 only has to be equipped with the tip part 19*a* at one end.

In drawings, reference numeral 20 represents a spring which is inserted between the end of the piercing pipe 10 and the sealing plate 3, and biases the piercing pipe 10 to move upwardly with the resilience.

The piercing pipe 10 has a contracted square shank 21 at upper end. The square shank 21 is fitted to a square hole 22*a* which is formed on the bottom surface of a seal piercing knob 22, which is the seal piercing member, and they are fixed together by using adhesive. In this case, instead of using adhesive on the square shank 21 and the square hole 22*a*, it is possible to fix them by screwing from the top of the seal piercing knob 22 or using a retaining ring.

The seal piercing knob 22 is formed in a shape of virtually elliptical plate with synthetic resins, on which the top surface is gently recessed so as to accommodate a finger. A chevron-shaped rib 23 is projected on the front peripheral edge and a knob of a tab 24 is arranged overlapped on the base side of the rib 23.

The tab 24 is formed by bending the synthetic resin rod, which has the same quality as of the piercing device 2, into a virtually triangular shape, and the knob 24*a* is formed by bending the apex diagonally upward.

Then, the knob 24*a* is disposed on the middle part of top surface of the seal piercing knob 22 to accommodate placing a finger 25 thereon. The knob 24*a* can be pulled up with a connecting part 26, which protruded from back end, as a fulcrum.

The connecting part 26 is formed diagonally downward, with the lower end connected to the rear end of the safety plate 27.

The safety plate 27 is formed with the same member as the tab 24 and of an elliptical shape which is little larger than the tab 24.

The notch 28 is formed in the front-back direction on the half front of a safety plate 27, and a notch 28 is engaged with upper part of the seal piercing pipe 10.

Specifically, the safety plate 27 is usually inserted between the seal piercing knob 22 and the upper surface of the outer pipe 6. The piercing pipe 10 is engaged with the notch 28 to prevent pulling out the safety plate 27 and pressing the seal piercing tab 24. When the tab 24 is raised and pulled up, the safety plate 27 can be pulled backwardly along the notch 28.

On the other hand, the outer pipe 6 is constituted with two pieces that are split in the axial direction along a jetting port guide, which will be described later, and the cylinder holder 5 is stored therein. Connecting surfaces 29*a*, 29*b*, are integrally attached as one with heat welding. In such a case, the outer pipe pieces 6*a*, 6*b* can be joined together by screwing or using adhesive instead of heat welding.

Irregular-shaped engaging holes 30*a*, 30*b* capable of storing the cylinder holder 5 are symmetrically formed on the connecting surfaces 29*a*, 29*b* of the outer pipe pieces 6*a*, 6*b*. One side of the connecting surfaces 29*a*, 29*b* has guide holes 31*a*, 32*b* that constitute a funnel-like jetting port guide 31.

In the drawings, reference numerals 32*a*, 32*b* represent pin holes that are formed on the inner surfaces of the engaging holes 30*a*, 30*b* permitting the positioning pin 15, 15 to be inserted.

A chevron-shaped protrusion 33 is formed in the axial direction on the back periphery of the outer pipe 6, and a seat belt guide 34 is protruded outside of the protrusion 33 obliquely downward from the upper end of the outer pipe 6, virtually parallel with the protrusion 33.

A seat belt introduction groove 36 for insertion of a seat belt 35 is formed between the seat belt guide 34 and the protrusion 33.

A cutter 37 is arranged at upper part of the introduction groove 36. An edge of the cutter 37*a* is vertically arranged, and acutely arranged with respect to the direction of introducing the seat belt 35. The seat belt 35 can be cut at sharp angle with respect to a direction of the thickness of the seat belt 35.

The seat belt guide 34 is constituted by joining guide pieces 34*a*, 34*b* that extend from outer pipe pieces 6*a*, 6*b*. Concave grooves 39*a*, 39*b*, that are virtually parallelogram shape, are formed in axial direction over the joining surfaces 38*a*, 38*b* and the connecting surfaces of 29*a*, 29*b* of the outer pipe pieces 6*a*, 6*b*. The cutter 37 is stored in the concaved groove 39*a*, 39*b*.

In the drawings, a pin 40 which protrudes from the recessed grooves 39*a*, 39*b* is inserted in a fitting hole 41 formed on the cutter 37 to prevent displacement.

The outer pipe 6 has lower periphery on which the front and back sides are concavely curved, and the cross sectional view is an elliptical shape. Curved concave parts 42, 43 respectively have a concave part 44 and a convex part 45 that form curved patterns for to make friction so that the part can easily or firmly grasped.

The outer pipe 6 has skirt-like peripheries on lower part and the skirt-portions are arranged apart at the outside of the periphery of the shoulder part. These spaces block heat conduction which lowers a temperature of the surface of the gas cylinder 1 when the extinguishing gas is jetted. Thus, the temperature drop of the curved concaved parts 42, 43 is inhibited.

The gas cylinder 1 has a sheet 46 made of heat insulating film on the middle periphery with printed pictures thereon that show how to use of the fire extinguisher gas ejector. The heat insulation action is obtained when putting out a fire.

In embodiment, the film made of synthetic resin is used for the sheet 46, the film is attached by shrinking with predetermined temperature on the surface of the gas cylinder 1 which is filled with carbon dioxide.

The hammer 47 having the pointed part is attached to the exposed bottom of the gas cylinder 1, and a hammer 47 is molded by sintering to a predetermined hardness with a prescribed powder metal.

The hammer 47 is shaped in a thin, concavely or convexly curved plate capable of contacting the bottom of the gas cylinder 1. A pointed part 48, which is a cone shape, is protruded from the center of the convex surface side.

After molding to the predetermined shape with sintering, the hammer 47 of the embodiment is prepared to high hardness by quenching with the predetermined temperature. The prepared hammer 47 is attached to the bottom of the gas cylinder 1, which is filled with carbon dioxide, by spot or other welding.

Accordingly, the hammer 47 can be attached to the gas cylinder 1 smoothly and safely without changing a conventional process or filling facility of carbon dioxide for the gas cylinder 1.

In this case, the hammer 47 can also be attached by bonding or brazing instead of spot welding. A thick steel plate is press molded to said shape instead of molding the hammer 47 with sintering, and the hammer can also be attached by spot welding, other welding, bonding, or soldering.

In illustration, reference numeral 49 shows the extinguishing gas jetting for outside from the jetting port guide 31 after the seal is pierced. Reference numeral 50 shows a windshield of a car.

The fire extinguisher gas ejector, which is constituted by the way above, is constructed by attaching the piercing device 2 on top of the small gas cylinder. The small gas cylinder 1 is constituted by attaching the hammer 47 for an emergency escape. The piercing device 2 is constituted with the piercing pipe 10, the piercing knob 22, the safety plate 27 which is integrally formed with the tab 24, and the cutter 37 for cutting a seat belt for escaping in case of an emergency.

When making a fire extinguisher gas ejector, the hammer 47 is molded by sintering. After the sintering, the hammer 47 is prepared for predetermined hardness and is attached to the bottom of the small gas cylinder 1 by spot welding.

The piercing device 2 is produced by combining following parts. The resin molded outer pipes 6*a*, 6*b*, the piercing knob 22 and the tab 24 that are respectively resin molded, and the cylinder holder 5, the piercing pipe 10, and the cutter 37 that are metal processed.

Then, when making the hammer 47 firstly, prescribed powder metal is molded by sintering and shape it into concavely or convexly curved thin plate. Then, the conically shaped pointed part 48 is protruded on the center of the convex surface side.

Figure 10:
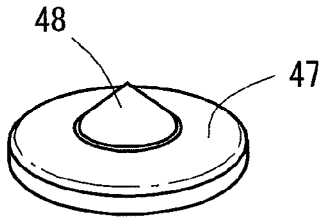
FIG. 10 is a perspective view showing the reversed hammer which is applied to a first embodiment.

This state is shown in the FIG. 10. After the molding, the pointed part 48 is prepared for high hardness by quenching with a predetermined temperature.

When attaching the hammer 47, which is produced by the way above, to the gas cylinder 1, the hammer 47 is spot welded to the gas cylinder 1 which is filled with the extinguishing gas, carbon dioxide, and sealed with the sealing plate 3.

The spot welding is carried out by connecting the concavely curved surface of the hammer 47 with the bottom of the gas cylinder 1, energizing, and welding. The state is shown in the FIG. 9.

In this case, the spot welding temporarily causes high temperature. However, the filled carbon dioxide has no risk for an ignition, explosion, or a sudden expansion. After the spot welding, the current state is promptly recovered so that the operation of spot welding is performed safely.

Moreover, there is no risk for a deformation due to thermal stress of the spot welding or a crack due to a distortion. Therefore, the strength of the gas cylinder 1 is maintained, and the state of the filled carbon dioxide remains the same.

The sealing plate 3 is also sealed by spot welding after filling the carbon dioxide. This suggests that it is safe to carry out a spot welding to the gas cylinder 1.

Moreover, the spot welding to the gas cylinder 1 is carried out after the carbon dioxide is filled. Therefore, filling operation of the carbon dioxide can be carried out in a conventional manner by using filling facilities that already exist. It will not reduce the productivity and the efficiency.

Accordingly, decrease of safety or productivity can be avoided unlike a case in which the spot welding is carried out before filling carbon dioxide, which affects the use of the conventional facilities of filling by the spot welded hammer 47 or causes decrease of efficiency and productivity due to changes of operations.

In this case, it is also possible to attach the hammer 47 to the filled gas cylinder 1 by bonding or brazing instead of spot welding.

Of them, bonding does not require any special facility for attachment. Little consideration needs to be given to effects of temperature of spot welding and thermal stress on the filled gas.

Moreover, brazing requires lower temperature compared to spot welding. It reduces effects of temperature of brazing on filled gas and thermal stress. At the same time, similar advantages and strength can be obtained as spot welding.

Meanwhile, a thick steel plate is press molded into the above-mentioned shape and it can also be attached by spot welding, bonding or brazing instead of molding the hammer 47 with sintering.

The way above does not require an expensive facility for sintering and molding and simple and low cost production is possible by the press molding.

After the hammer 47 is attached, the sheet 46 is attached on the middle periphery of the gas cylinder 1.

In the embodiment, a film made of synthetic resin is used for the sheet 46 with printed pictures that show usage of the fire extinguisher gas ejector. Then, the film is cut to a predetermined size and formed in shape of roll. The periphery of the gas cylinder 1 is covered with the sheet, and then, shift it into a heat furnace with predetermined temperature for heat contraction. The shrunk film is attached on the middle periphery of the gas cylinder 1.

Next, when producing the piercing device 2, the outer pipe pieces 6*a*, 6*b*, the piercing knob 22, and the safety plate 27 are separately resin molded, the cylinder holder 5 and the piercing pipe 10 are machine processed with different diameter aluminum bars, and the cutter 37 is produced by press molding the steel plate.

Of them, outer pipe pieces 6*a*, 6*b* are formed by cutting axially the outer pipe 6 into half at the position of the jetting port guide 31. And the center of the connecting surfaces 29*a*, 29*b* of the cylinder body side have the engaging holes 30*a*, 30*b* and the engaging holes 30*a*, 30*b* have the pin holes 32*a*, 32*b* on the middle.

Furthermore, one sides of the connecting surface 29*a*, 29*b* have the guide holes 31*a*, 31*b* that constitute the jetting port guide 31. The concave grooves 39*a*, 39*b* that store the cutter 37 are formed on the other sides.

On the other hand, the guide pieces 34*a*, 34*b* are integrally protruded from the outside of the cylindrical body side. A part of the concave grooves 39*a*, 39*b* is formed on the connecting surfaces 38*a*, 38*b*.

Moreover, the curved concaved parts 42, 43 are disposed on front and back peripheries of the outer pipe pieces 6*a*, 6*b*. The curved concave part 42 of front side has a plurality of the concaved parts 44, the concaved part 43 of back side has a plurality of the convex parts 45.

The seal piercing knob 22 is shaped in an elliptical plate which has longer major axis in front and back and the top surface is gently concaved and curved. The chevron-shaped rib 23 is protruded from the front side and square hole 22*a* is disposed on the lower surface.

The safety plate 27 and the tab 24 are integrally formed. Of them, the safety plate 27 and the seal piercing knob 22 are shaped in virtually the same elliptical plate, and the notch 28 is disposed on the front side.

The tab 24 is formed in a shape of regular triangular by using a flat bar and the knob 24*a* is formed by turning up the front obliquely upward. The rear of the knob 24*a* is connected to the back of the safety plate 27 by the connecting part 26 which protruded obliquely downward.

The cylinder holder 5 is formed cylindrical in which the through hole 8 and the hole 9 are formed therein. The holes are smooth and have different diameters. The lower part of the cylinder 5 has the screw hole 7, and the jetting port guide 13 and the nozzle hole 14 that are disposed on the middle circumference are communicating with the through hole 8.

A pair of recessed holes 16 is disposed diametrically on the surface of the circumference of the cylinder holder 5. The pins 15, 15 are pressed into the recess hole 16.

The seal piercing pipe 10 is formed in a bar shape, the large-diameter part 10*a* and the annular groove 17 are disposed on the middle, and the square shaft 21 are formed on the top end. One end of a steel pipe is obliquely cut to make the needle tube 19, one end of the tube 19 is pressed into lower end of the piercing pipe 10, and the tip part 19*a* is protruded outside.

In this case, the needle tube 19 can be omitted if the piercing pipe 10 is integrally provided with the tip part 19*a*.

Moreover, the cutter 37 is produced by press molding a steel plate, and the fitting hole 41 is disposed on the middle, and the edge of the cutter 37*a* is disposed on the side edge.

After the parts above are produced, the piercing device 2 is produced by assembling them.

For assembly, the engaging hole 30*a* of the outer pipe piece 6*a* is stored in the cylinder holder 5, the positioning pin 15 is inserted to the recess hole 32*a*, the cutter 37 is stored in the recessed groove 39*a*, and the fitting hole 41 is inserted to the pin 40.

Then, the connecting surface 29*a* of the other outer pipe piece 6*b* is joined with the connecting surface 29*a*, the positioning pin 15 is inserted into the recess hole 32*b* of the engaging hole 30*b*, and after the connecting surfaces 29*a*, 29*b* are attached, the outer pipe pieces 6*a*, 6*b* are connected together.

When heat welding is used for the connection, for example, an electrical heat plate (not shown) is inserted between the connecting surfaces 29*a*, 29*b*. Then, applying current to the electrical heat plate and heated to a melting temperature. After the connecting surfaces 29*a*, 29*b* are melted, the electrical heat plate is pulled out, connecting surfaces 29*a*, 29*b* are welded, and the cutter 37 and the cylinder holder 5 are integrally buried therein.

In this case, when adhesion is used for connection, adhesive material is applied to the connecting surfaces 29*a*, 29*b*. When screwing is used for the connection, screw holes are previously disposed at corresponding positions of the outer pipe pieces 6*a*, 6*b* and connect them together by screwing.

The piercing pipe 10 is inserted from the lower side of the through hole 8 of the cylinder holder 5 of the connected outer pipe 6. The top end of the square shaft 21 is protruded from the hole 9, the square hole 22*a* of the seal piercing knob 22 is fitted into the square shaft 21 with the rib 23 facing front, and they are connected together and fixed.

In this case, instead of the attachment above, the square shaft 21 and the seal piercing knob 22 can be fixed by screwing or can be attached with a retaining ring.

After the piercing knob 22 is mounted on the square shaft 21, the safety plate 27 is inserted therebetween. The notch 28 is inserted to the top of the piercing pipe 10 with the safety plate 27 sandwiched, and the assembly of the piercing device 2 is completed when the tab 24 integrally formed with the safety plate 27 is attached on the seal piercing knob 22.

As for shape, assembled piercing device 2 is composed about 83 mm high, about 60 mm long in front-back direction, and about 43 mm in external diameter. When the gas cylinder 1 is loaded to the piercing device 2 which the hammer 47 is already attached thereto, the spring 20 is inserted to the through hole 8 of the cylinder holder 5 of the piercing device 2, O-ring 12 is attached to a step between the through hole 8 and the screw hole 7, and the thread part 4 of the gas cylinder 1 is screwed to the screw hole 7.

Figure 2:
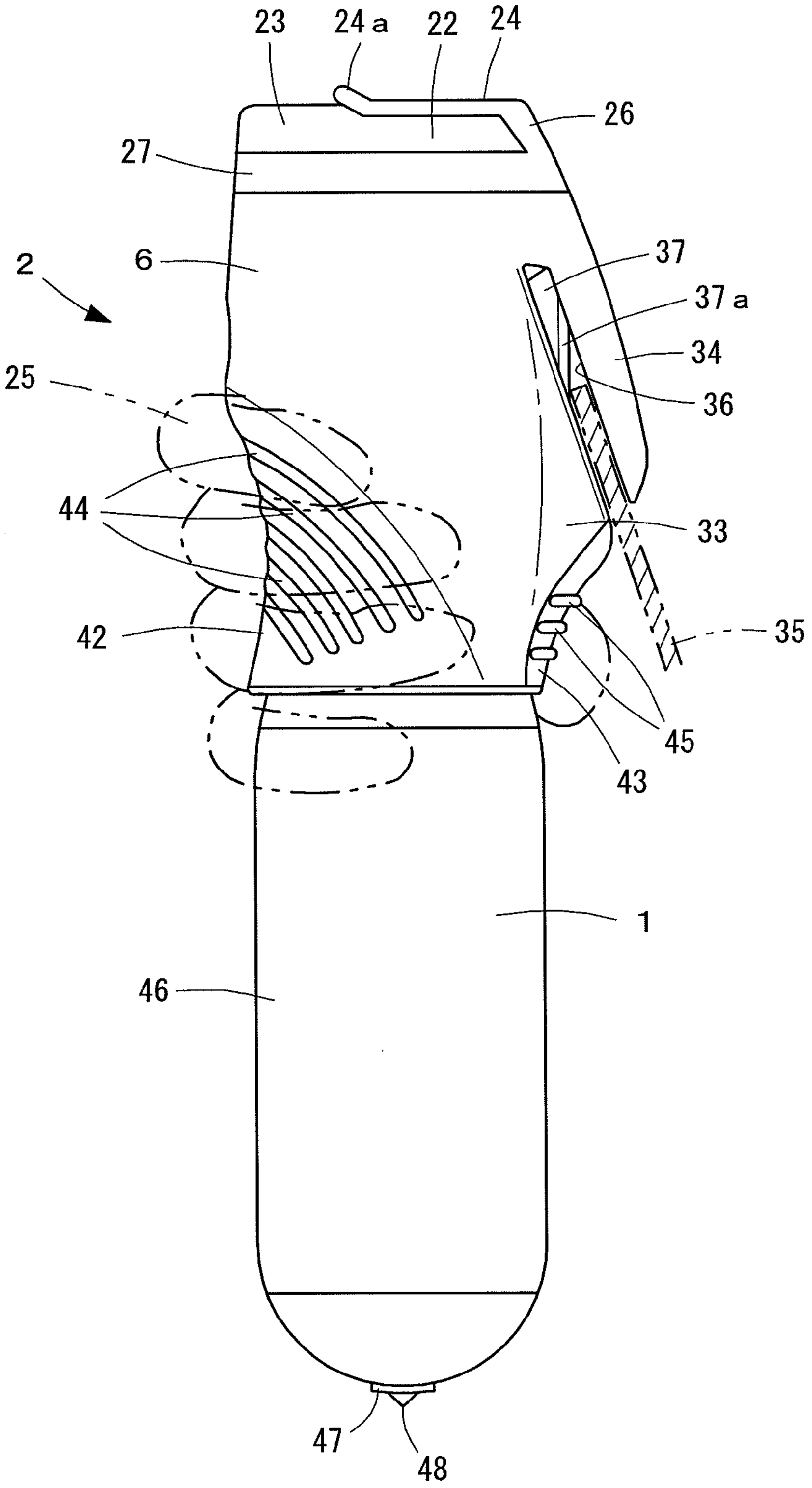
FIG. 2 is a front view of FIG. 1 showing a state in which the seat belt is cut.
Figure 3:
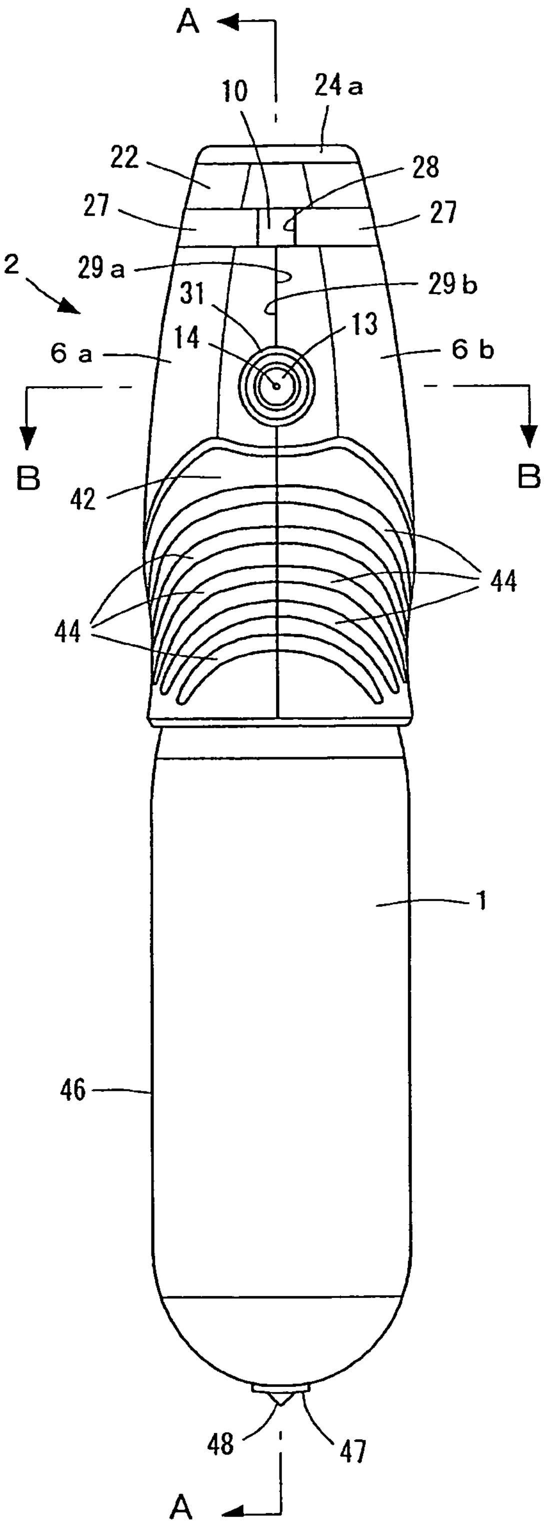
FIG. 3 is a left side view of FIG. 1.

The fire extinguisher gas ejector which loaded the gas cylinder 1 is shown in the FIG. 1 to FIG. 3 and is constituted small and lightweight, 183 mm high and weigh 460 g. Unlike conventional ones, it does not require a case that covers the outside of the gas cylinder 1 so that the constitution becomes simpler and lightweight. Accordingly, it can be produced easily and at low cost.

Moreover, the cutter 37 and the hammer 47 are provided with the gas cylinder 1 and piercing device 2, essential components for the fire extinguisher gas ejector. It does not require an exclusive device for escaping so that the mechanisms for fire extinguishing and escaping are constituted rationally. As for advantages, these functions can be used simply.

The assembled fire extinguisher gas ejector has the tab 24 with the knob 24*a* raised and exposed on the seal piercing knob 22, and the safety plate 27 integrally formed with the tab 24 is located between the seal piercing knob 22 and the outer pipe 6.

The jetting port guide 31 is located at middle and high position on front of the outer pipe 6, the seat belt guide 34 is protruded obliquely downward, and the edge 37*a* of the cutter 37 is perpendicularly disposed in the upper seat belt introduction groove 36.

The curved concaved parts 42, 43 that form the grasping part are located immediately below the jetting port guide 31 and the seat belt guide 34. The upper part of the gas cylinder 1 is located inside of the concaved parts 42, 43 via space.

Figure 4:
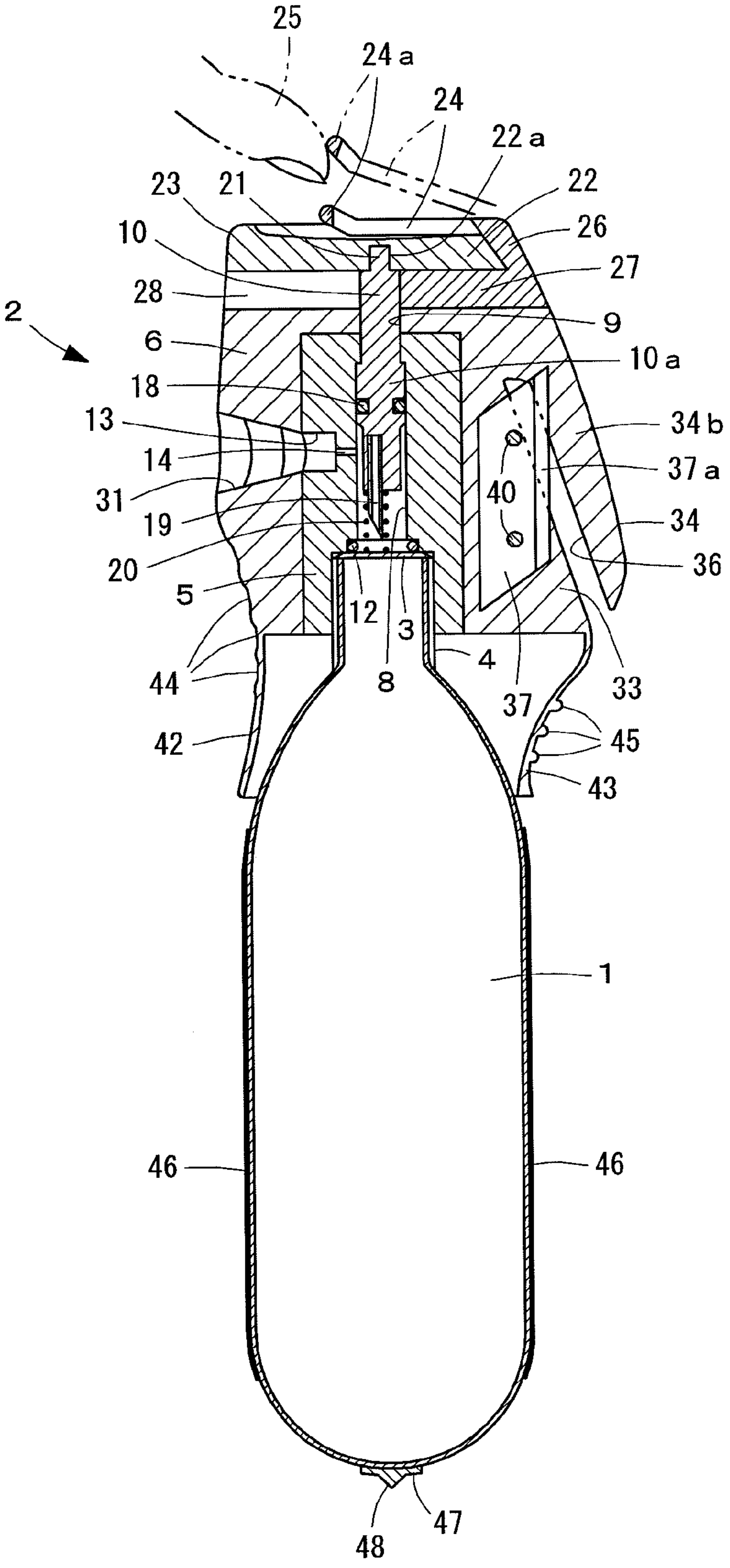
FIG. 4 is a sectional view taken along the line A-A of FIG. 3 showing a state of pulling up the tab.
Figure 5:
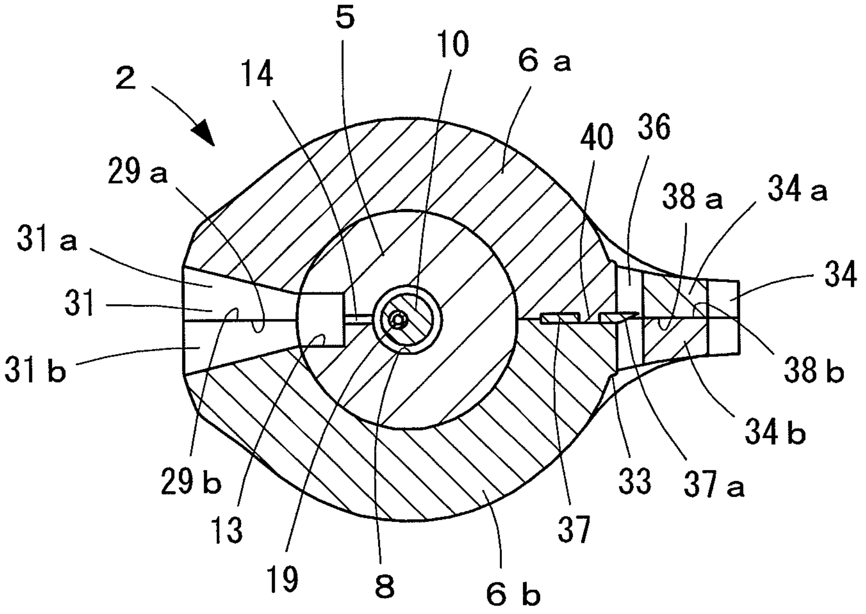
FIG. 5 is a sectional view taken along the line B-B of FIG. 3.
Figure 6:
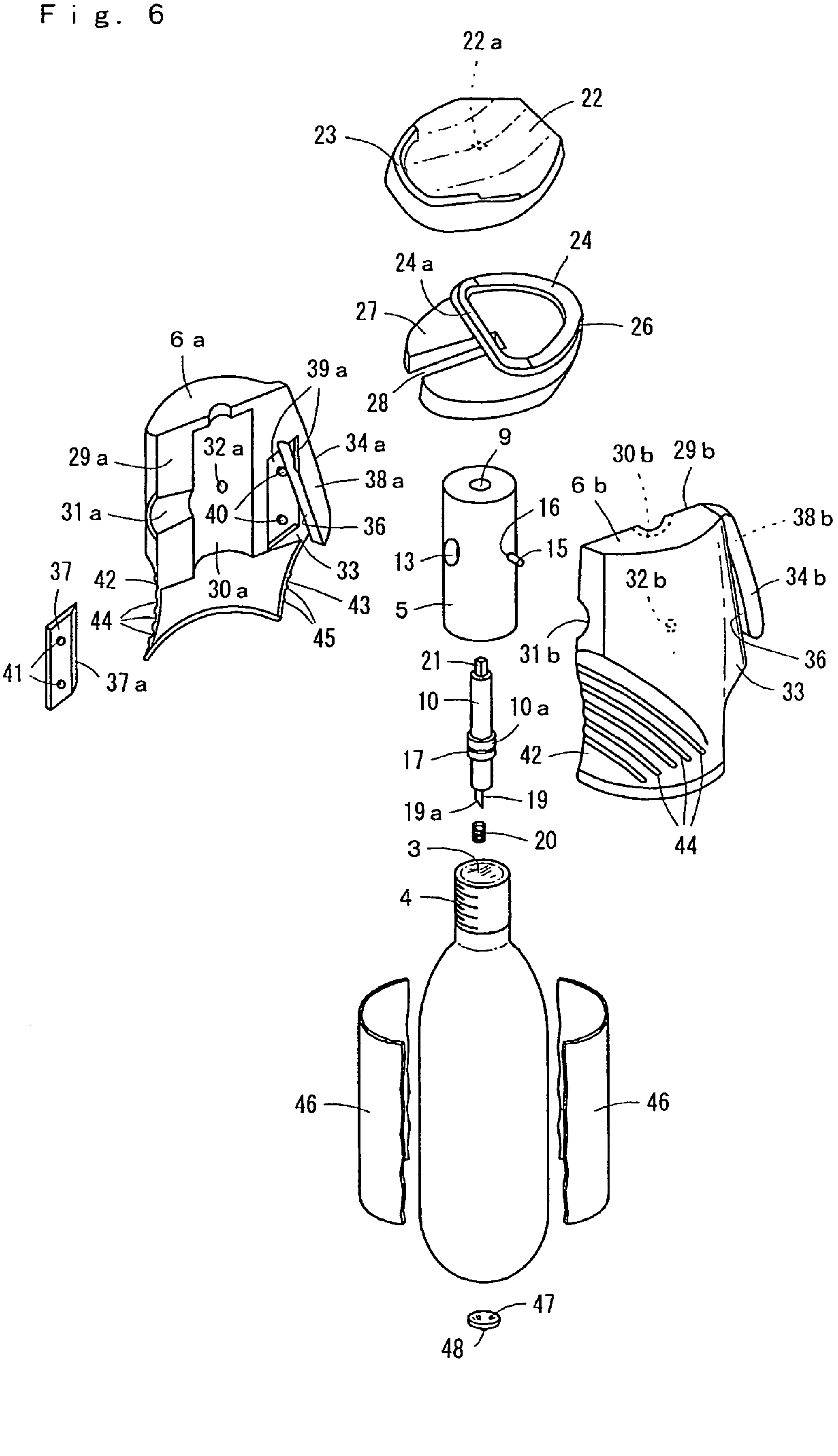
FIG. 6 is an exploded perspective view showing parts of a first embodiment.
Figure 7:
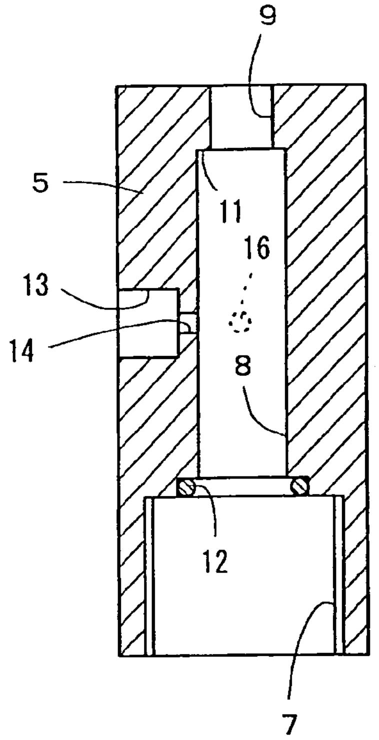
FIG. 7 is an enlarged longitudinal-sectional view of the cylinder holder which is applied to a first embodiment.
Figure 8:
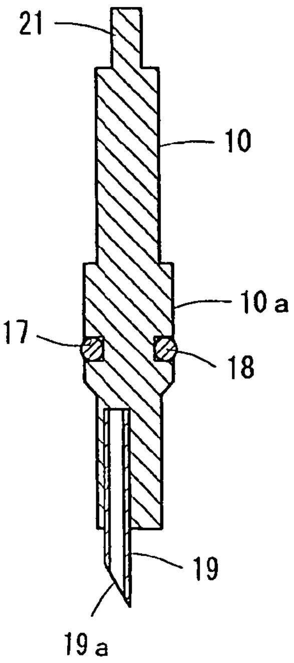
FIG. 8 is an enlarged longitudinal-sectional view of the piercing pipe which is applied to a first embodiment.
Figure 9:
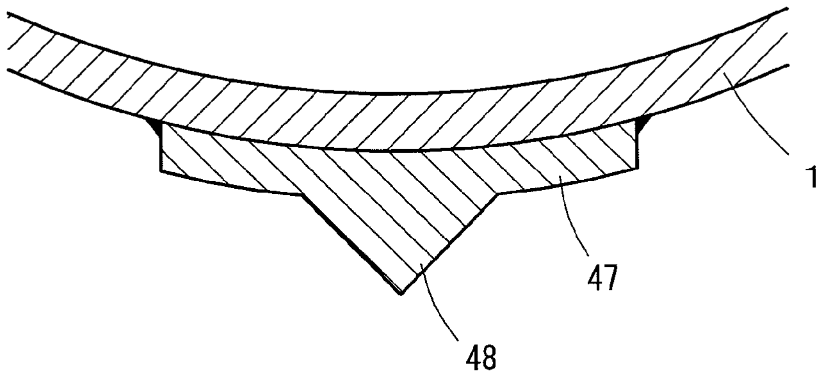
FIG. 9 is an enlarged sectional view showing the state of installing a hammer which is applied to a first embodiment.

The mouth part for the gas cylinder 1 is sealed with the sealing plate 3 as shown in FIG. 4, the piercing pipe 10 is located immediately above the sealing plate 3 to be able to move up-and-down, the piercing pipe 10 is biased upwardly to move with the resilience of the spring 20 and the tip part 19*a* of the needle tube 19 is located immediately above the sealing plate 3.

The sheet 46 is attached to cover the middle periphery of the cylinder 1, the hammer 47 is disposed to the bottom of the cylinder 1, and the pointed part 48 is downwardly exposed. In this case, it is preferable that a suitable cover is removably attached on the pointed part 48.

When installing such fire extinguisher gas ejector on a car, it is stored transversely or longitudinally around a driver seat, front seat, for example, a pocket of inner side of a door or an accessory case which is around a shift lever.

In this case, a cross sectional view of the piercing device 2 is formed in an elliptical shape of which has a major axis in front and back direction so that rolling motion, abnormal noise and damage of fire extinguisher gas ejector can be prevented when it is put transversely.

In that case, preferably, if an appropriate holder is mounted to said position in a car to fix the fire extinguisher gas ejector, further stability can be obtained.

When the device is installed on a car and if the seat belt 35 cannot be taken off or/and a door does not open by a traffic accident, the seat belt 35 need to be cut and/or a windshield 50 needs to be broken when a driver or other member evacuate outside of the car.

Of them, when cutting the seat belt 35, the curved concaved parts 42, 43 are grasped facing the seat belt introduction groove 36 of the piercing device 2 front, the seat belt 35 is inserted into the seat belt introduction groove 36 to contact the edge 37*a* of the cutter 37, and the piercing device 2 is pulled down to slice through the seat belt 35. The state is shown in the FIG. 2.

In this case, the seat belt introduction groove 36 is obliquely and downwardly open with respect to the axial direction of the piercing device 2 so that the seat belt 35 can be smoothly inserted by the chevron-shaped protrusion 33 compared to a one which has a groove opens perpendicularly and downwardly.

Moreover, the edge 37*a* of the cutter 37 is disposed at an acute angle with respect to the introduction direction of the seat belt 35. The edge 37*a* of the cutter 37 cuts into the side edge of the seat belt 35 and prompt smooth cutting, compared to a edge of a cutter is disposed at right angle with respect to the seat belt introduction groove.

Figure 11:
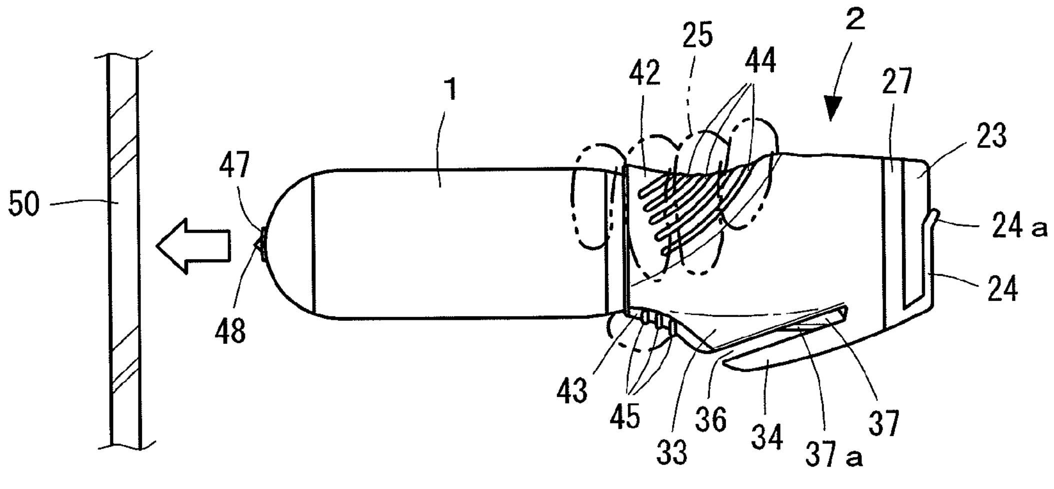
FIG. 11 shows a state in which a windshield of a car is broken from inside by the hammer which is applied to a first embodiment.

When breaking the windshield 50, the fire extinguisher gas ejector is grasped with the bottom pointing a car side window or windshield, as with the case cutting the seat belt 35. Then, a windshield 50 is smashed with the pointed part 48 of the hammer 47 by smashing and striking the windshield 50. This state is shown in FIG. 11.

In this case, when breaking the windshield 50 after the seatbelt 35 is cut, the windshield 50 can be broken in continuous motion without shifting the fire extinguisher gas ejector. Similarly, when cutting the seat belt 35 after breaking the windshield 50, the seat belt 35 can be cut in continuous motion without shifting a fire extinguisher gas ejector.

Accordingly, the action can be carried out quickly and safely compared with the one which dispose the seat belt introduction groove 36 and the hammer 47 at the same side or different position.

Moreover, the hammer 47 is disposed apart from the seat belt introduction groove 36 so that the windshield 50 is smashed surely and there is no fear of being injured.

Neither the operation nor impact of cutting the seat belt 35 and breaking the windshield would separate the safety plate 27 from the fixed position. The movement of the piercing pipe 10 is prevented so there is no fear of seal piercing accidentally.

Next, explanations for the fire extinguisher gas ejector are described below.

Specifically, if a fire occurs and it is extinguished when the fire extinguisher gas ejector is installed in a car, hold the fire extinguisher gas ejector with one hand, and put the finger 25 on the knob 24*a* of the tab 24 and pull up. The state is shown in FIG. 4.

In this case, the tab 24 is configured the same as a known tab for opening a beverage container so that an operation for pulling the knob 24*a* up is easily understandable. It is possible to respond to a fire in a car which needs quick operations.

Thus, when the knob 24*a* of the tab 24 is raised, the tab 24 is pulled up with the rear connecting part 26, as a fulcrum, against resilience. The component force for backward acts on the safety plate 27 which is integrally formed with the tab 24 through connecting part 26.

Therefore, the safety plate 27 is moved backward against the engaging force of the piercing pipe 10 and the notch 28, and the safety plate 27 is pulled out backwardly.

Figure 12:
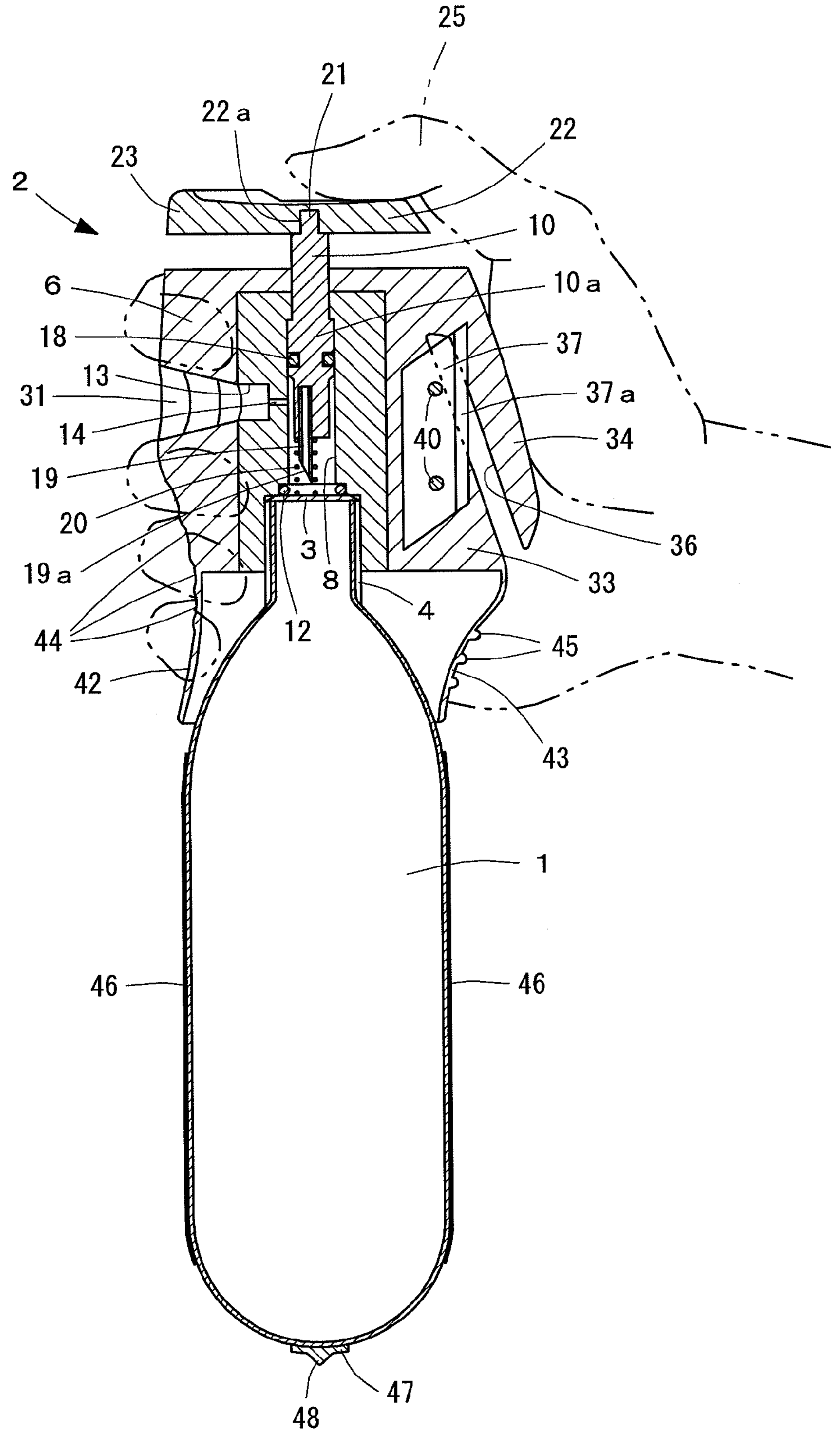
FIG. 12 is a sectional view of a first embodiment showing a state in which after the safety member is pulled out.

The state is show in FIG. 12. The top surface of the seal piercing knob 22 is exposed, and a space, which is the same thickness as the safety plate 27, is formed between the seal piercing knob 22 and the top edge of the outer pipe 6.

Then, the fire extinguisher gas ejector is shifted to grasp the curved concaved parts 42, 43 and the piercing device 2 as shown in FIG. 12. Then, the finger 25 is put on the top of the seal piercing knob 22 and press down the seal piercing knob 22.

Figure 13:
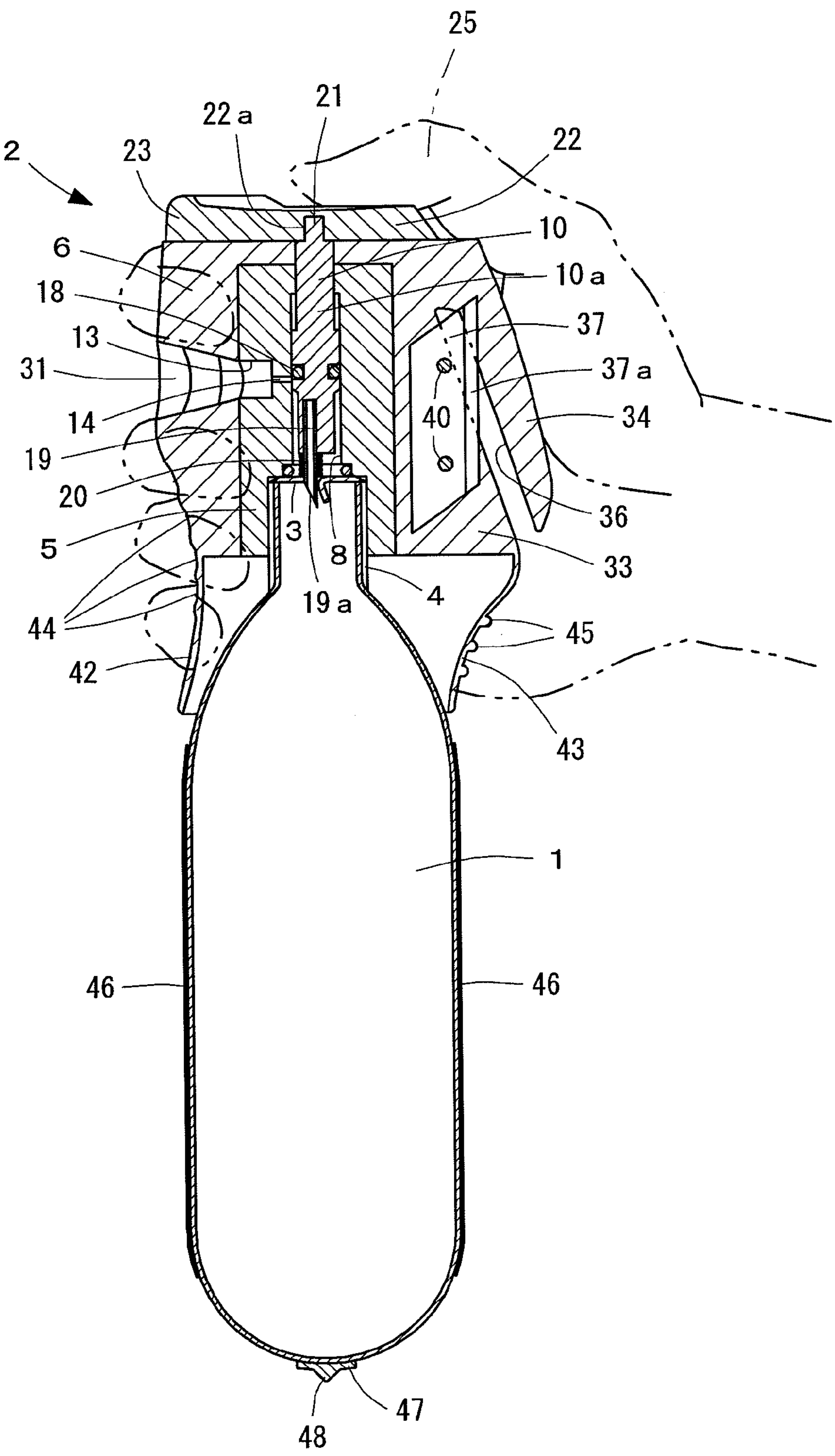
FIG. 13 is a sectional view of a first embodiment showing that the piercing member is pushed down for the seal piercing after the safety member is pulled out.

In this way, the piercing knob 22 is descended against the resilience of the spring 20, which moves the piercing pipe 10 accordingly, and the tip part 19*a* of the needle tube 19 pierces the sealing plate 3. The state is shown in FIG. 13.

This introduces the filled gas of the gas cylinder 1 to jet from the pierced point to the needle tube 19, and the pressure acts on the needle tube 19 and the piercing pipe 10. Consequently, the jetting pressure thrusts back the piercing pipe 10 and the top end of the large diameter part 10*a* is contacted with the step 11 and returned to the original position to stop.

Figure 14:
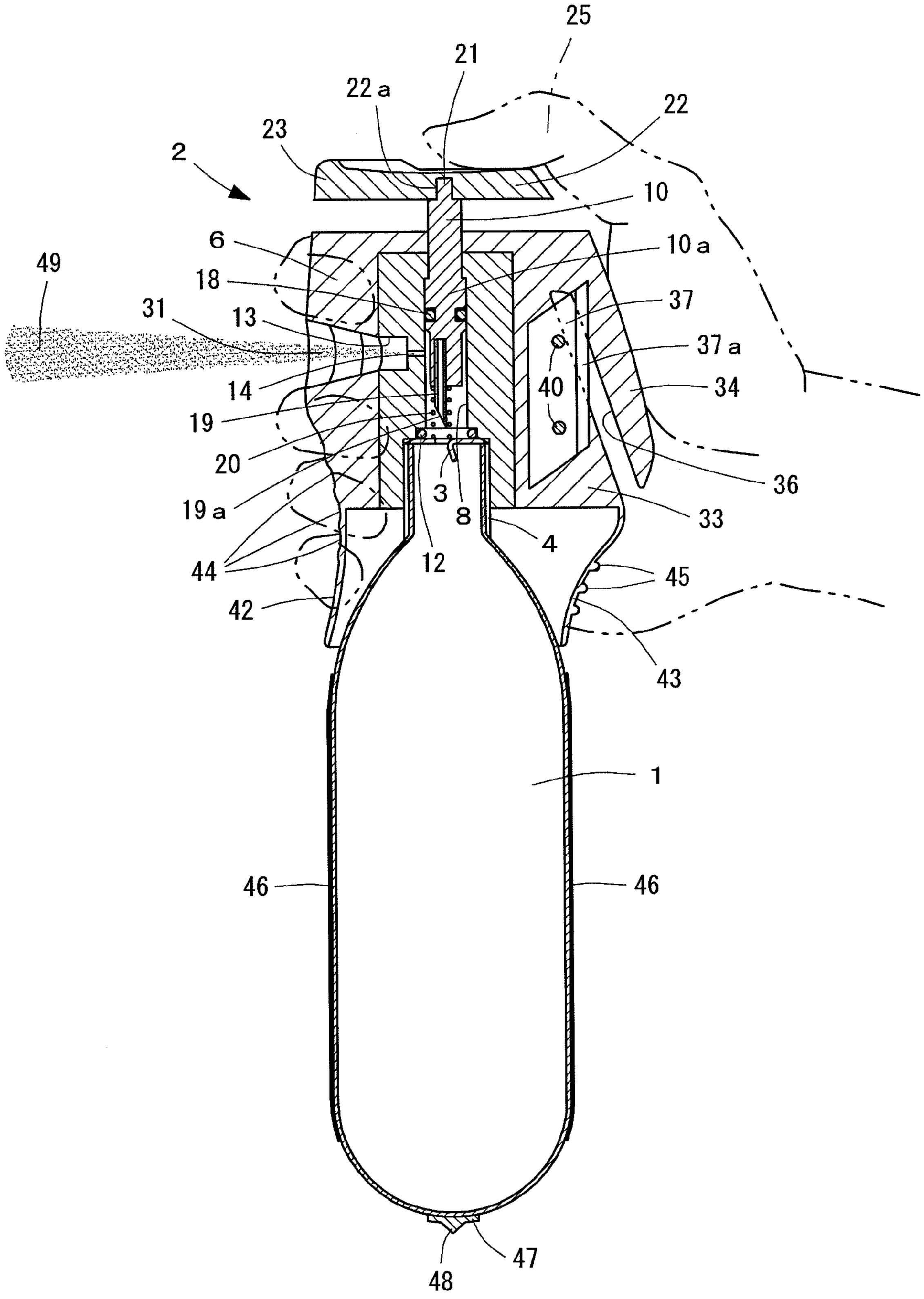
FIG. 14 is a sectional view of a first embodiment showing that the extinguishing gas is jetted outside by pushing down the piercing member after the seal is pierced.

The state is shown in FIG. 14. The needle tube 19 is moved immediately above the sealing plate 3, the pierced point of the sealing plate 3 is communicated with the through hole 8, and the through hole 8 is communicated with the nozzle hole 14 and the jetting port 13.

Accordingly, the filled gas is jetted from a pierced hole to the through hole 8 and it is introduced from the nozzle hole 14 to the jetting port 13. Then, the gas is jetted outside from the jetting port guide 31 and sprayed onto the source of the fire.

At this time, a part of the carbon dioxide is adiabatically expanded to become dry ice after jetting the filled gas and it is mixed with the gaseous carbon dioxide and jetted toward the origin of a fire.

Thus, it lowers a temperature around a fire origin and stops oxygen supply. It promotes efficiency and quick fire extinction.

At this time, when the carbon dioxide is jetted, the latent heat cools and absorbs the heat of the surface of the gas cylinder 1. The skirt part, which is close to the cylinder 1 and lower side of the piercing device 2, prevents heat conduction by a space disposed inner side so that the finger 25 is not affected.

The fire extinction continues until all the filled gas is completely used so that the filled gas can be effectively used. Thus, the effectiveness of the fire extinction is increased.

Moreover, after the filled gas is used up, the empty gas cylinder 1 can be easily recovered after detaching the gas cylinder 1 from the screw hole 7 of the cylinder holder 5.

FIG. 15 to FIG. 28 shows other embodiments of the present invention, and identical numerals are used for the parts that have the same constitution with the above mentioned embodiment.

Figure 15A:
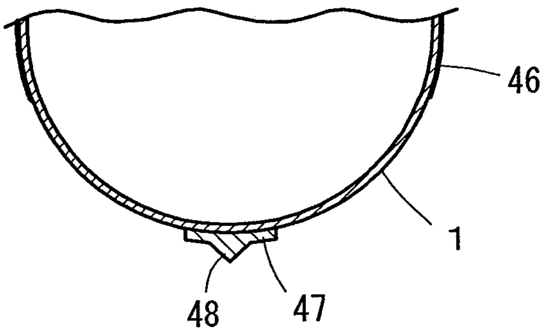
FIGS. 15(*a*) and 15(*b*) show a second embodiment of the present invention and is a sectional view of other embodiment of the hammer. In (a), the hammer is attached by gluing. (b) shows a state in which the hammer is insert molded with the cylinder cover and the cover is attached to the gas cylinder.
Figure 15B:
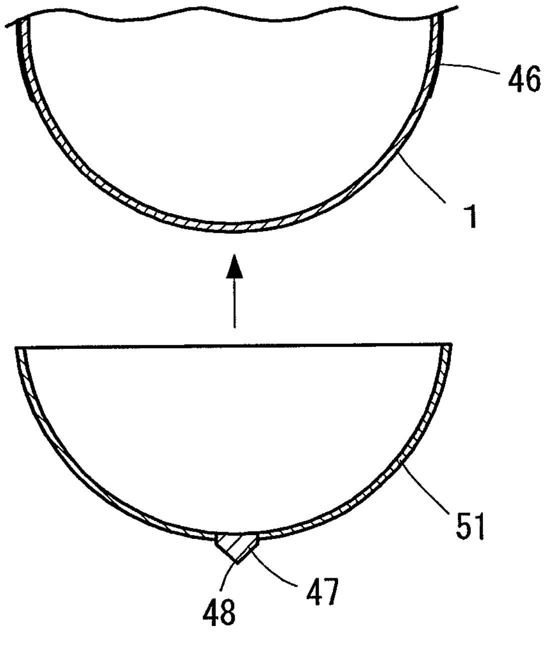

Of them, FIG. 15 is a second embodiment of the present invention showing the other embodiment of the hammer 47.

Specifically, in FIG. 15 (*a*), the hammer 47 which is made from sintered metal or press molded steel plate is attached to the bottom of the gas cylinder 1 to alleviate a concern over strength reduction of the gas cylinder 1 due to thermal stress by heating of spot welding and brazing.

In FIG. 15 (*b*), the hammer 47 is insert molded by use of a bowl-shaped plastic cylinder cover 51. The cover 51 is attached to the exposed bottom of the gas cylinder 1 so that the cover 51 is rigidly attached.

FIG. 16 to FIG. 22 is a third embodiment of the present invention showing other cutting form of the seat belt 35, the other form of the hammer 47, and installed form of the fire extinguisher gas ejector in a car.

Of them, as for other cutting form of the seat belt 35, the edge 37*a* of the cutter 37 is disposed obliquely downward in the middle of the seat belt introduction groove 36, and a seat belt releasing part 52 is disposed with a space at the rear of the cutter 37.

The seat belt releasing part 52 is integrally formed with the joining part 53 which is disposed back of the seat belt introduction groove 36. The joining part 53 is constituted by attaching a pair of joining pieces 53*a*, 53*b* that connect the seat belt guide 34 and the outer pipe 6, and the seat belt releasing part 52 is protruded adjacent to the neck portion 54 of the joining part 53.

The seat belt releasing part 52 is constituted by connecting a pair of seat belt releasing part pieces 52*a*, 52*b*. The cross sectional view has a shape of inverted triangular, which the width increases as it goes to the back of the seat belt introduction groove 36 from the distal end, the seat belt releasing part 52 has wider width except the distal end than the thickness of the cutter 37, and the periphery which curves outside forms the seat belt releasing surface 55. In illustration, reference numeral 56 indicates a space between the cutter 37 and the seat belt releasing part 52.

In this embodiment, the cylinder holder 5 is formed by aluminum and has the through hole 8 therein, which communicates with the nozzle hole 14. The cylinder holder 5 is buried in the inner pipe cover 57, which is made of synthetic resin, as a insert fixture to make them integrated. The jetting port 13 and the jetting port guide 31 are formed on the inner pipe cover 57, and the outer pipe 6 is disposed outside of the inner pipe cover 57.

Upper part of the outer pipe 6 has a pair of guide holes 58, and the guide pin 59 which is integrated with the seal piercing knob 22 is slidably inserted to the guide hole 58. The seal piercing knob 22 has a flat surface top and a recess hole 60 on the center. The threaded shaft 61 which is provided on the top end of the seal piercing pipe 10 is disposed in the recess hole 60, and the seal piercing knob 22 is attached to the piercing pipe 10 by screwing the nut 62 into the threaded shaft 61.

The spring 63 which is inserted between the top end surface of the inner pipe cover 57 and a flanged part of the upper end of the piercing pipe 10 is used as a substitute of the spring 20 which is disposed around the needle tube 19. The resilience of the spring 63 biased the seal piercing knob 22 upwardly. In illustration, reference numeral 64 shows a cap which closes the recess hole 60.

The tab 24 of the embodiment is disposed immediately above the end of the seal piercing knob 22 with the knob 24*a* extended. The safety member 27 which is integrally formed with the tab 24 is formed in a shape of a ring from a plate. This arrangement promotes the operation of pulling the tab 24 up with notches 65, 66 as a fulcrum and the operation of pulling the safety member 27 out.

Figure 17:
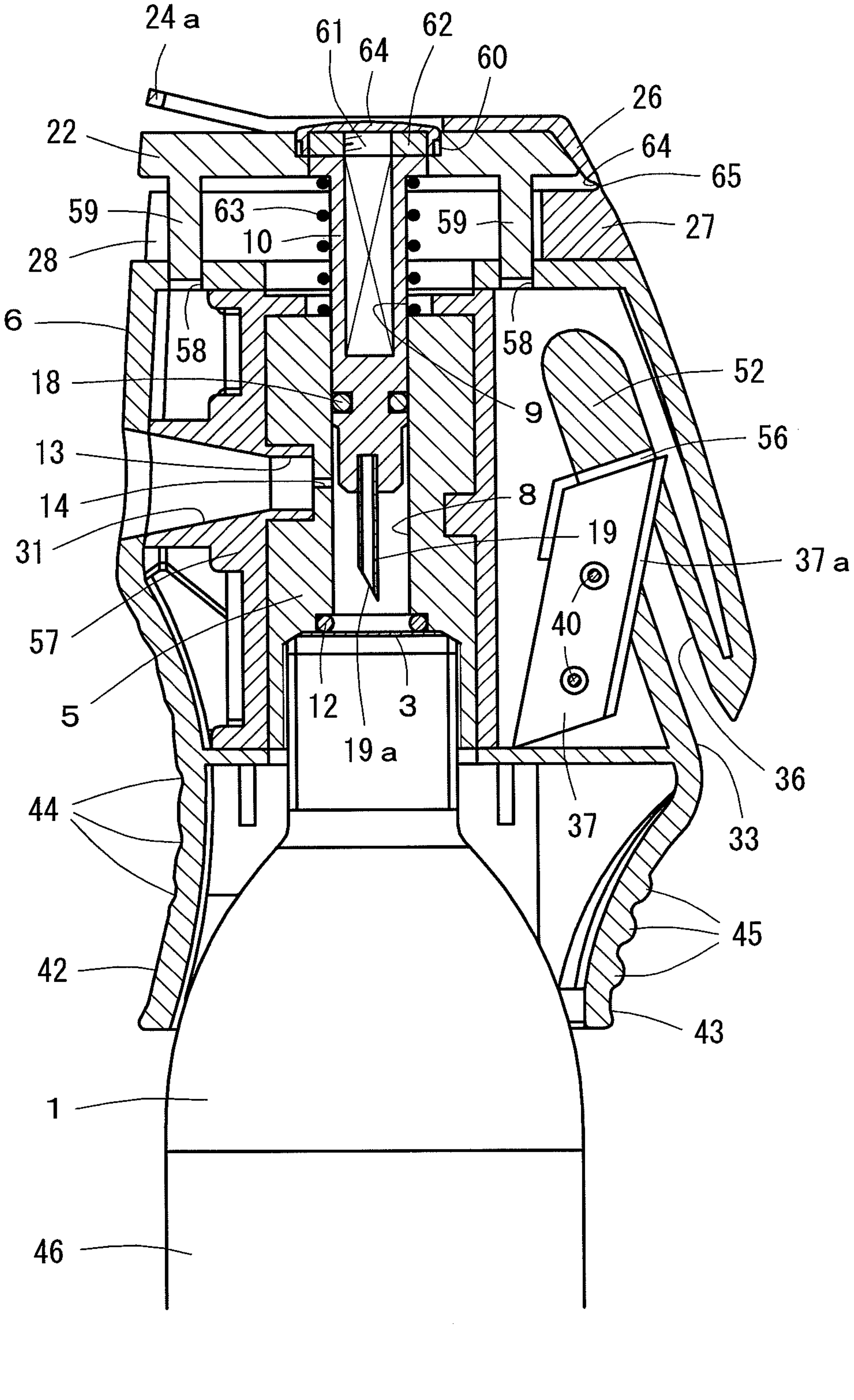
FIG. 17 is an enlarged sectional view of a third embodiment showing a state before piercing the seal and a situation in which the seat belt introduction groove and the cutter is attached.

FIG. 17 shows the statement of the embodiment in which before the seal is pierced. The spring 63 biased the seal piercing knob 22 upwardly, intervening the safety member 27 just under the seal piercing knob 22. The tab 24 is located immediate above the seal piercing knob 22 and the tab 24 is normally restrained to the seal piercing knob 22 with an adhesive seal (not shown).

When piercing the seal, the adhesive seal is broken, and the knob 24*a* of the tab 24 is held to pull up and moved toward upper right in FIG. 17. Then the seal piercing knob 22 is pulled out and make a space just under the seal piercing knob 22.

Figure 18:
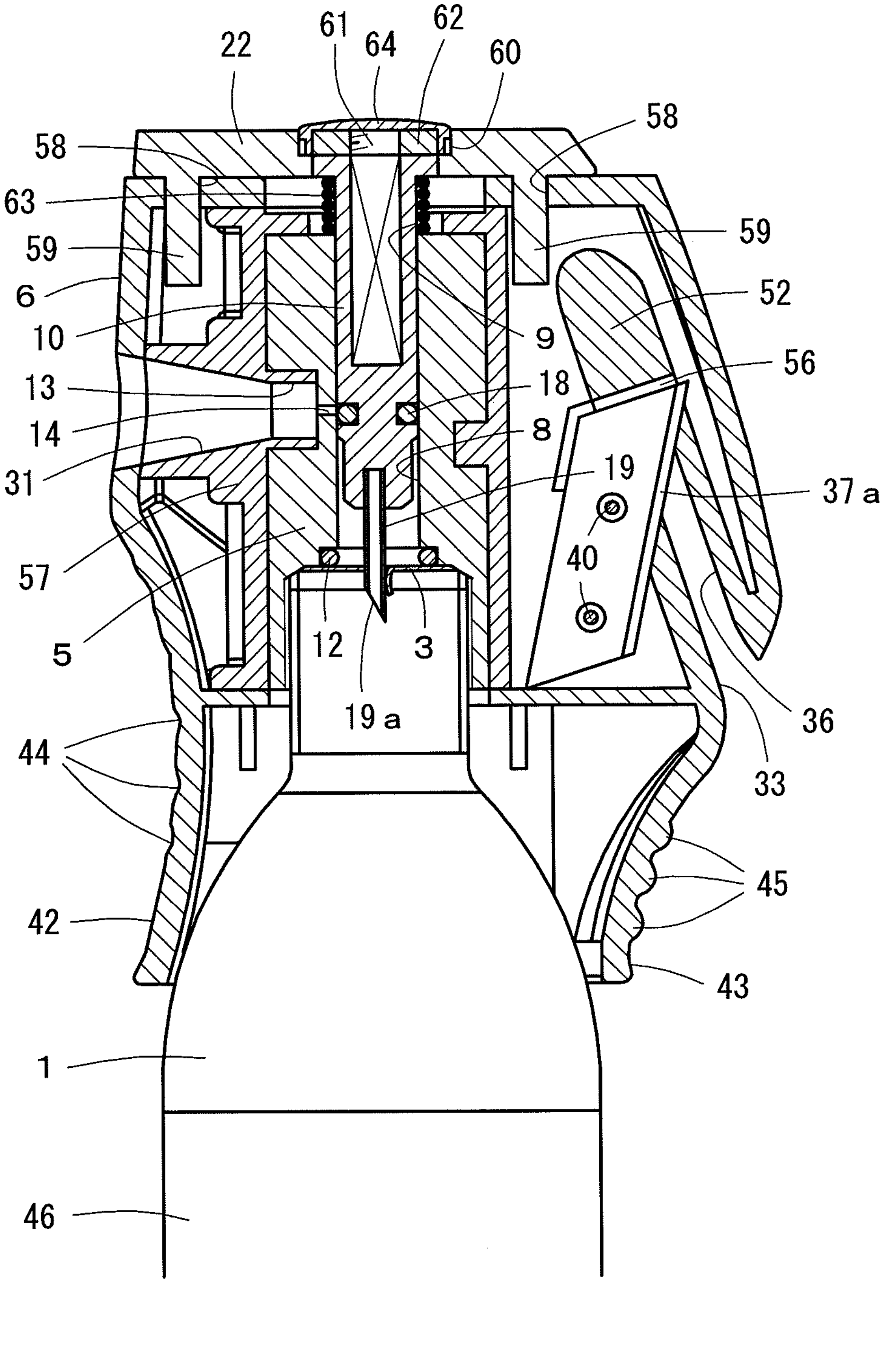
FIG. 18 is an enlarged sectional view of the third embodiment showing a state in which the seal is pierced.
Figure 19:
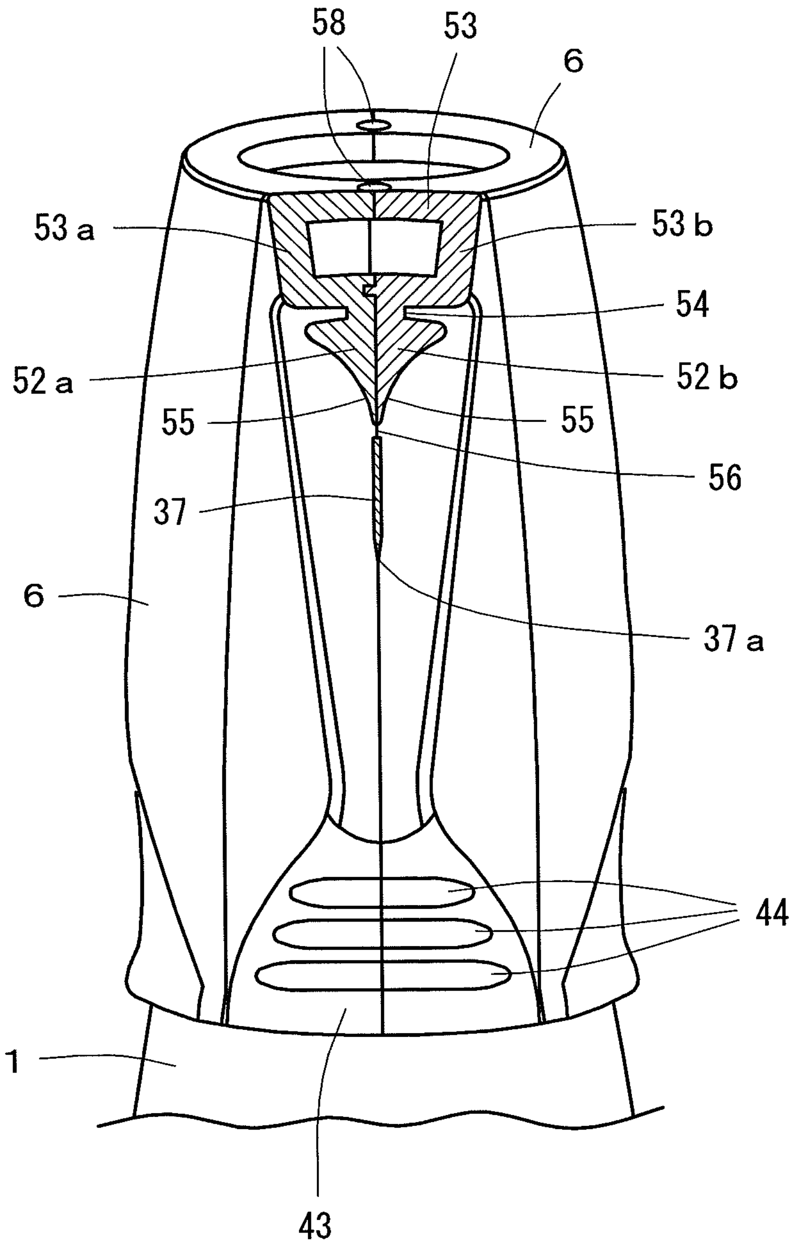
FIG. 19 is a sectional view of the FIG. 16 taken along the line of C-C showing enlarged seat belt releasing part applied to a third embodiment.

Then, the piercing knob 22 is pressed down against the spring 63 and the piercing pipe 10 is pressed down, and it moves the needle tube 19 in accordance with the move of the piercing pipe 10. The sealing plate 3 is pierced with the tip part 19*a* of the needle tube 19. The state is shown in FIG. 18.

After the seal is pierced, the extinguishing gas in the gas cylinder 1 is jetted out, pushing up the piercing pipe 10 by the extinguishing gas through the needle tube 19. The gas comes to the through hole 8, then the gas is introduced from the nozzle hole 14 to the jetting port guide 31 and is jetted outside.

On the other hand, in this embodiment, when cutting the seat belt 35, as mentioned above, the curved concaved parts 42, 43 are grasped facing the seat belt introduction groove 36 front, the seat belt 35 is held with another hand and inserted into the seat belt introduction groove 36

Then, a side of the seat belt 35 is contacted with the edge 37*a* of the cutter 37, and the piercing device 2 is pulled down quickly to slice through the seat belt 35.

Figure 20:
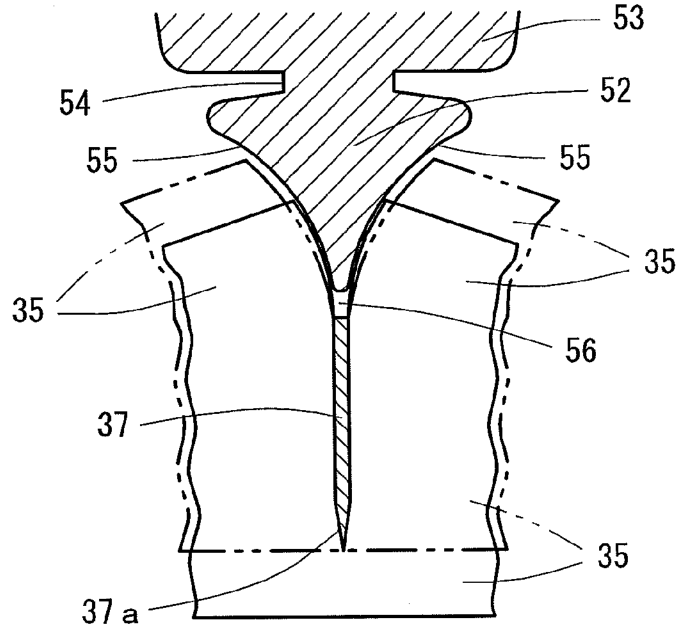
FIG. 20 is an enlarged illustration of an operation of cutting the seat belt by the seat belt releasing part.

The state is shown in FIG. 20. Firstly, the side of the seat belt 35 is cut through with the edge 37*a* of the cutter 37, and then the cut part is split in two sides along with the cutter 37 and moved to the back of the seat belt introduction groove 36.

Then, after the cut part passes through the space 56, the cutting pressure of the cutter 37 and the internal stress are released, then, the fiber is recovered and is moved to the distal end of the seat belt releasing part 52.

After this, the cut part is divided from the distal end and is moved to the back along with the both sides of the belt releasing surface 55, push opening the cut part. The spreading function reaches the other side of the seat belt 35, that is the cutting part side. It prevents the seat belt 35 and the cutter 37 from contacting both sides closely or stagnating. It promotes the seat belt 35 to move to the back smoothly.

Thus, the seat belt 35 moves smoothly without stagnation from the seat belt releasing part 52 to the edge 37*a* of the cutter 37 and smooth and quick cutting is carried out by the cutter 37.

In this case, when the seat belt releasing part 52 is closely located to the cutter 37 and the seat belt 35 is stuck in the minute space, the move of the seat belt 35 is stagnated and unable to cut the belt. The space 56 prevents the situation.

Figure 21:
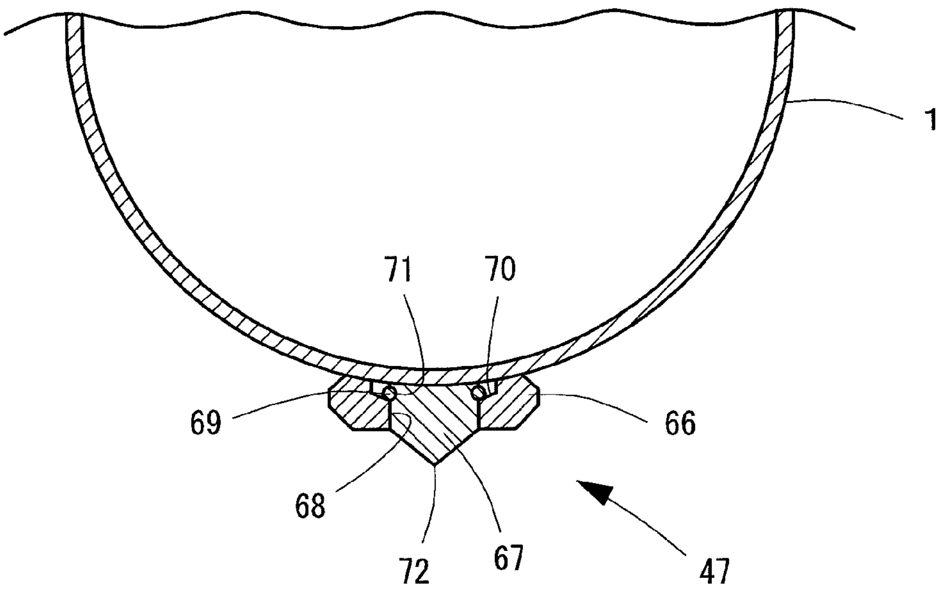
FIG. 21 is an enlarged sectional view of a main part of the hammer applied to a third embodiment.

FIG. 21 is an enlarged view of the hammer 47 that is applied to the other embodiment.

The hammer 47 of this embodiment is structured with the steel retaining ring 66 and the hammer shaft 67 which quenched steel hard material.

The retaining ring 66 is formed in a shape of plate and has the hole 68 in center. After the retaining ring 66 is welded to the bottom of the gas cylinder 1, the hammer shaft 67 is inserted to the hole 68 together with the stopper, the C-ring 69. After the insertion, the tapered surface 70 which is inner rim of the hole 68 is engaged with the C-ring 69 to attach the hammer shaft 67 closely.

The hammer shaft 67 has a shape of axis which is longer than the height of the retaining ring 66, the annular groove 71, the neck portion, is formed on the base, the pointed part 72 is formed at the end, and the pointed part 72 is protruded form outside of the retaining ring 66.

The welding of the retaining ring 66 is carried out after the carbon dioxide is charged to predetermined pressure and the mouth part is sealed with the sealing plate 3. After the welding of the retaining ring 66, the gas cylinder 1 and the retaining ring 66 are plated at the same time.

After that, an adhesive is applied to the periphery of the hammer shaft 67 which is processed with quenching and plating, the C-ring 69 which has elasticity and has a circular cross section is attached by squeezing to the annular groove 71. The hammer shaft 67 is inserted to the hole 68 while the C-ring is pushed and shrunk.

After the insertion, the tapered surface 70 of the inner rim of the hole 68 is engaged with the spherical surface of the C-ring 69 with the elasticity. The C-ring 69 is attached by pressure to the tapered surface 70 so that the wedge effect is obtained. The adhesive is put in the gap among the gas cylinder 1, the C-ring 69, and the hammer shaft 67, and then fixed to attach the hammer shaft 67 stiffly and tightly.

In this case, the retaining ting 66 is welded to the gas cylinder 1. The processes of welding and plating the hammer shaft 67 to the gas cylinder 1 are avoided by engaging the hammer shaft 67 to the retaining ring 66.

Accordingly, when the hammer shaft 67 is welded to the gas cylinder 1 and plated, it prevents the situation in which the pointed part 72 of the hammer shaft 67 damages the periphery of the gas cylinder 1.

As mentioned above, in this embodiment, conventional facilities are available for filling of the gas and for plating process. The hammer 47 can be attached surely and safely without changing the procedures.

Figure 22:
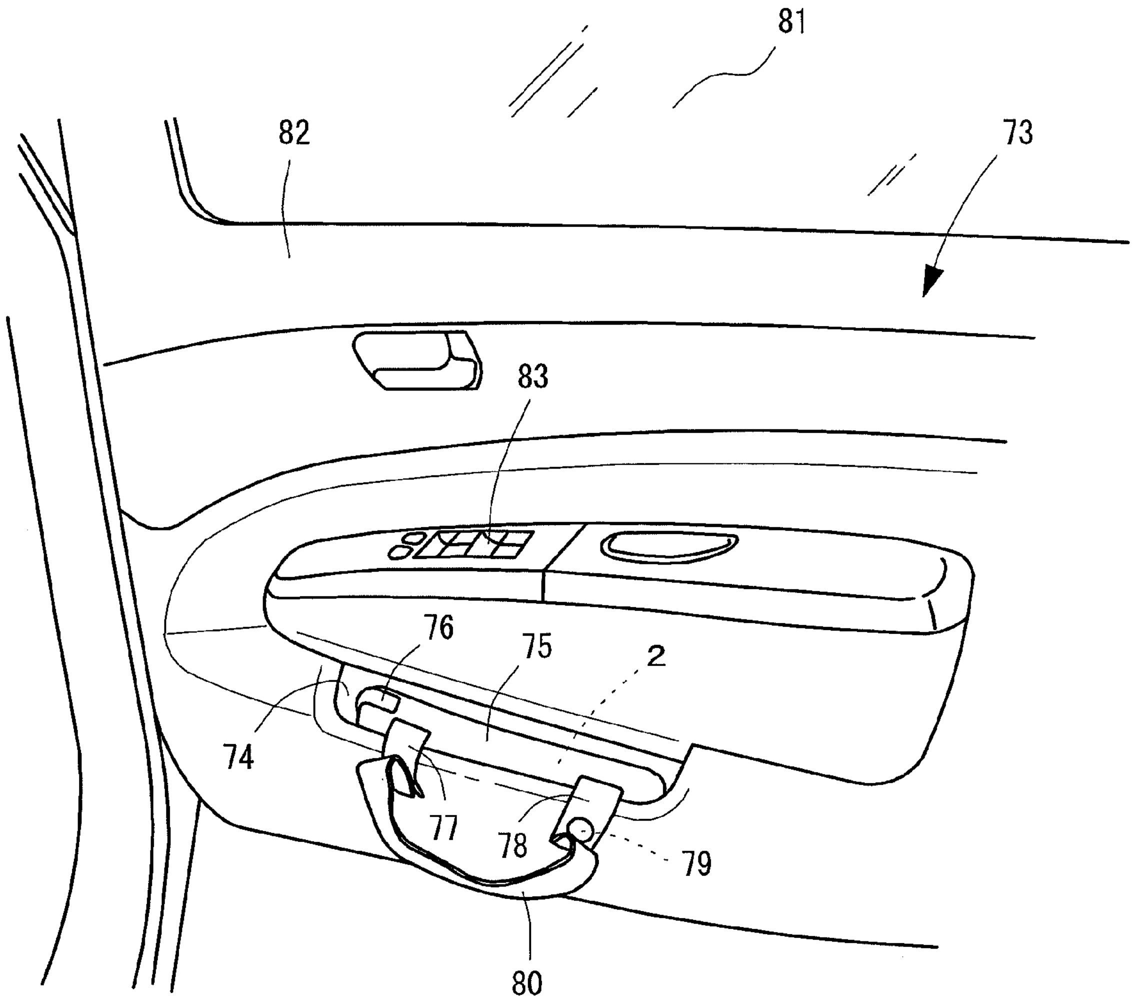
FIG. 22 is a perspective view showing a state in which the storing case applied to a third embodiment is installed in a car.

The FIG. 22 shows the fire extinguisher gas ejector which is installed in a car.

The storing case 75 which is like a elongated shape bag and stores the piercing device 2 with the gas cylinder 1 is stored in the concaved door pocket 74 which is provided with the inner side of a door 73 adjacent to the driver's seat.

The storing case 75 is made by sewing a plate of soft foamed polyurethane resin. It is structured with one end closed and the other end is open. The opening side has one end of the open-close belt 76 which is attached detachably.

One ends of attaching belts 77, 78 are respectively attached to the periphery of the storing case 75 and the simple stopper 79 such as a hook is disposed at the other ends, and a stopper 79 is removably attached to a stopper (not shown), such as a hook, which is buried outside wall of a door pocket 74 to fix a storing case 75 in place.

A strap 80 is attached to the other ends of the attaching belt 77, 78 and stuck out to face a driver's seat. When using the fire extinguisher gas ejector, hold the strap 80 with one hand and pull up to remove the fixation of the stopper. Then the storing case 75 is taken out from the door pocket 74.

After taking the storing case 75 out, one end of opening and closing belt 76 is undone, the piercing device 2 is taken out from the case 75 to carry out an operation of fire extinguishing, cutting of the seat belt 35, and breaking a windshield 81. In illustration, reference numeral 82 shows a door trim and 83 shows a power window device.

Figure 23:
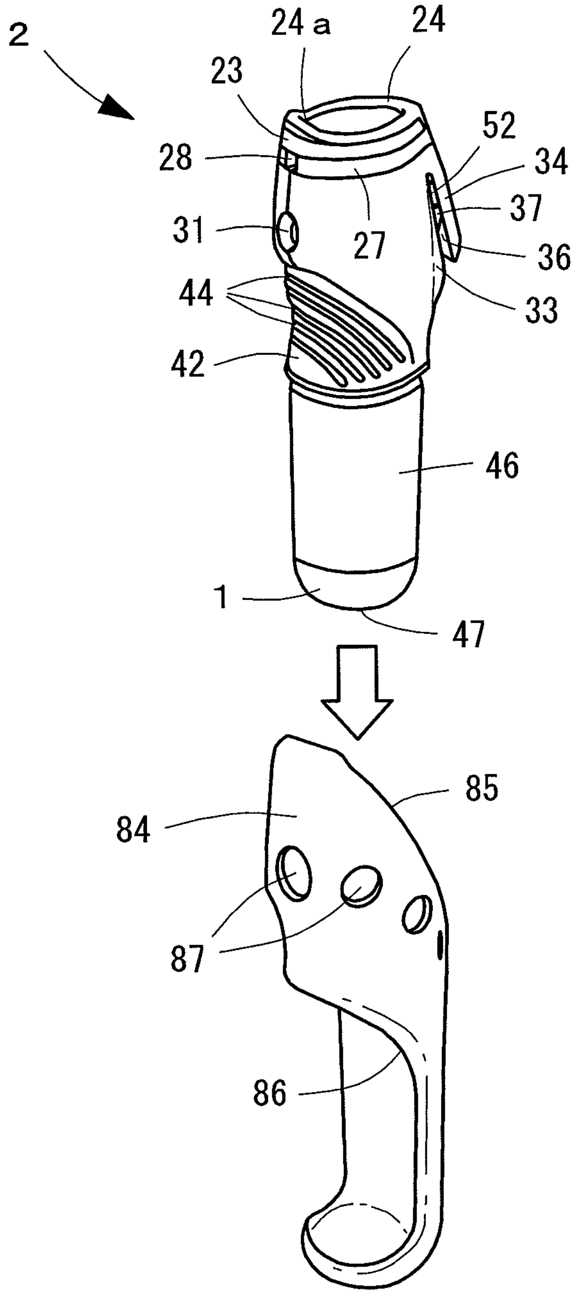
FIG. 23 is a perspective view showing the protective case applied to a fourth embodiment of the present invention. It shows the piercing device and the protective case before the piercing device is stored.
Figure 24:
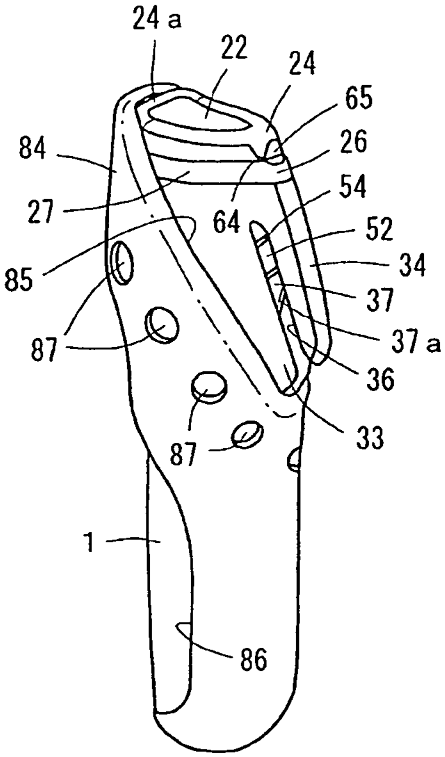
FIG. 24 is a perspective view of the protective case applied to a fourth embodiment showing a state in which the piercing device is stored.
Figure 25:
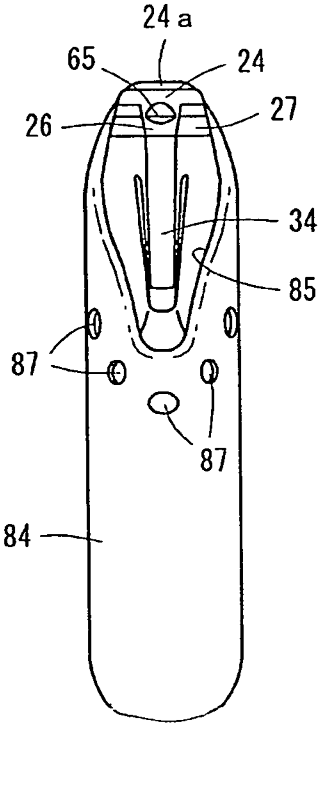
FIG. 25 is a right side view of FIG. 24.

FIG. 23 to FIG. 25 shows a forth embodiment of the present invention. The embodiment shows a bottomed protective case 84 for storing the piercing device 2 and the bottom of the case 84 covers the hammer 47. For easy carrying and safety of the piercing device 2, it is installed, for example, inside of a headrest and an appropriate place of a mat (not shown) to the fixed position by using a clip.

The protective case 84 is shaped like a vertically long bag using light and soft resin foam. There is an upper opening 85 which is made by cutting the body obliquely, and the upper opening 85 stores the seal piercing knob 22, the tab 24, the knob 24*a*, the seat belt guide 34, seat belt introduction groove 36, and the cutter 37, respectively exposed.

A lower opening 86 is formed on the lower part of the other side of the upper opening 85 of the protective case 84, with the periphery of the gas cylinder 1 located exposed from the lower opening 86. In illustration, reference numeral 87 shows a plurality of open holes that have different diameters formed around the upper opening 63. One of them is opened to correspond with the jetting guide 31.

In this case, when breaking the windshield 50, the piercing device 2 is taken out from the protective case 84 to carry out an operation. In that case, the upper opening 85, the lower opening 86, and the open hole 87 loosen the contact or adhesion between the protective case 84 against the piercing device 2 so that the piercing device 2 is taken out smoothly from the protective case 84.

Figure 26:
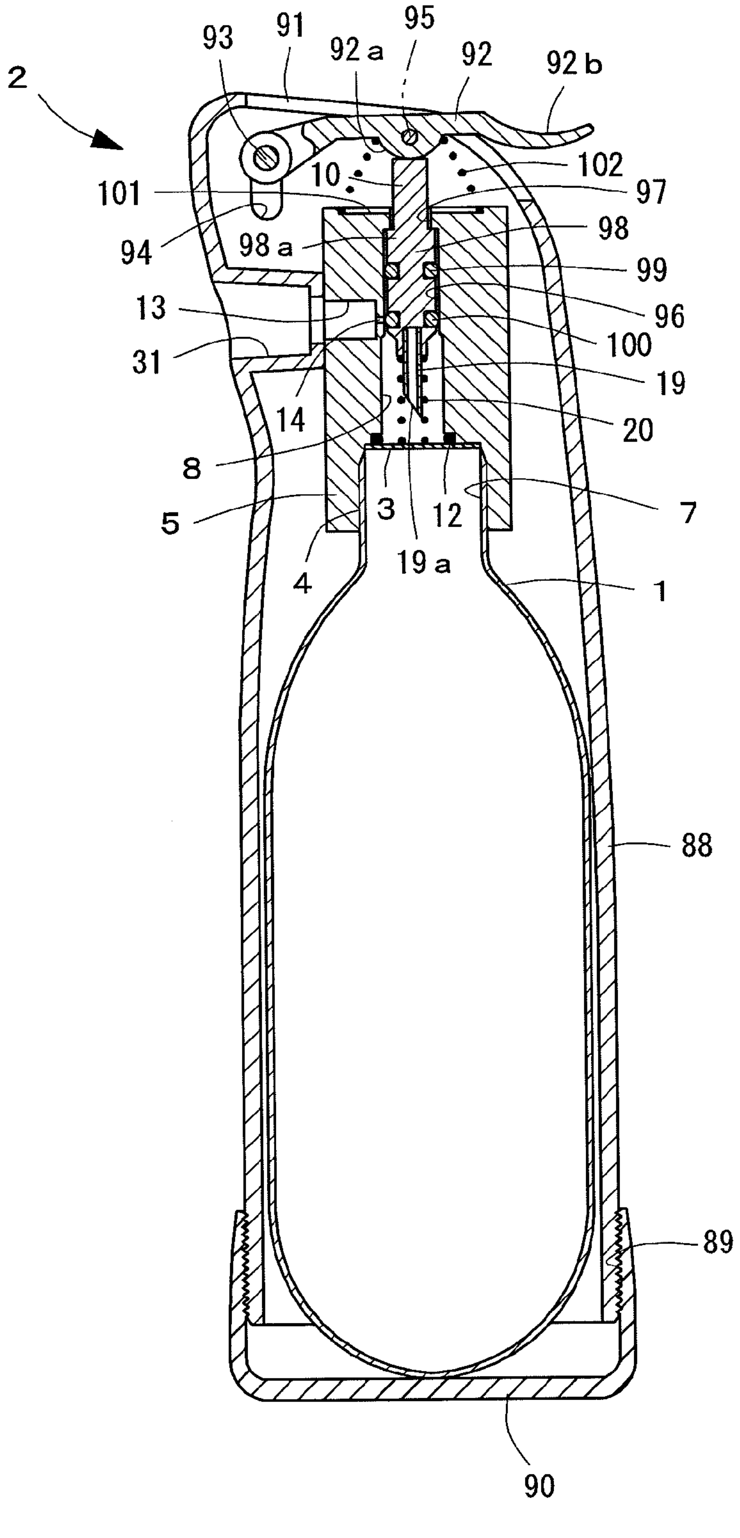
FIG. 26 is a sectional view of the fire extinguisher gas ejector applied to a fifth embodiment showing a state in which before the seal is pierced.
Figure 27:
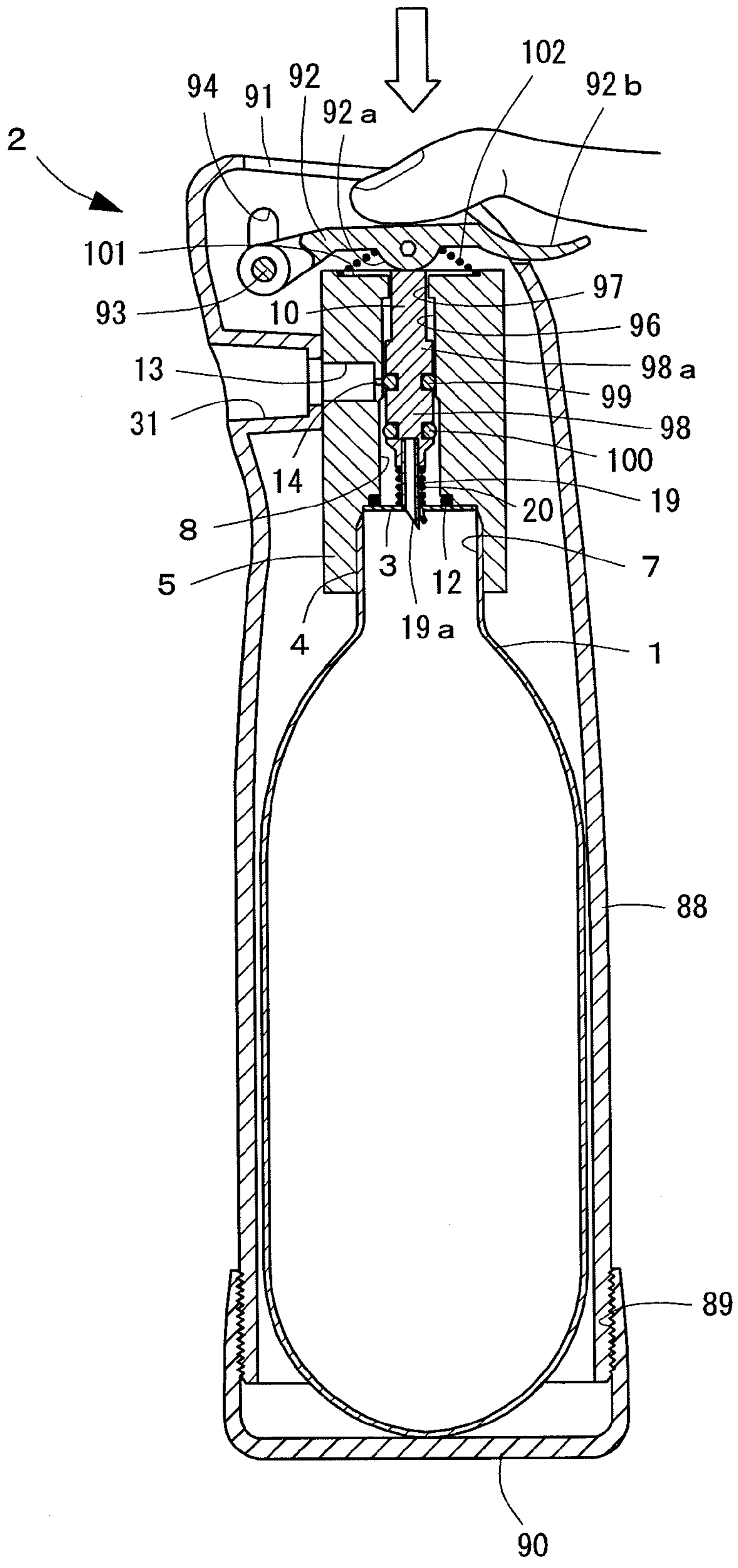
FIG. 27 is a sectional view of a fifth embodiment showing a state in which the seal is pierced.
Figure 28:
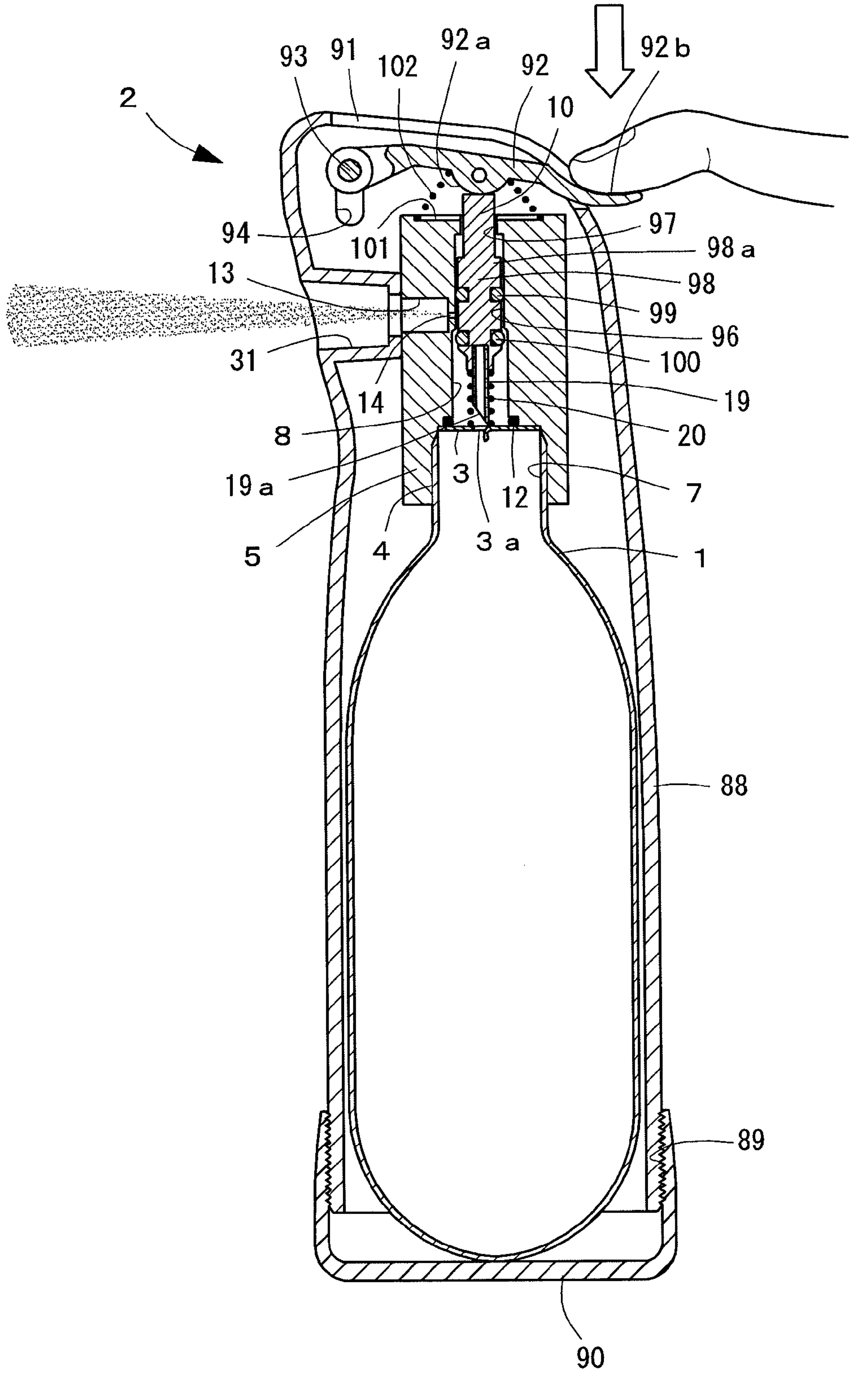
FIG. 28 shows a state in which the extinguishing gas is jetted from the nozzle hole by operating the piercing member after the seal piercing of a fifth embodiment.

FIG. 26 to FIG. 28 shows a fifth embodiment of the present invention. In this embodiment, a waste of the extinguishing gas is prevented by stopping discharging the extinguishing gas which is jetted from the gas cylinder after the seal is pierced. The gas can be jetted accurately toward a fire origin, and the effective use of the gas and initial fire fighting can be achieved. It shows the fire extinguisher gas ejector having the control valve for household use or in car use, which has simpler structure by reducing the number of the part.

In the fifth embodiment, reference numeral 88 shows a case which has a shape of a virtually hollow tubular made of synthetic resin. It is structured by joining a pair of cut cases that are formed by cutting the center in half in the longitudinal direction. The case has a screw part 89 on the lower periphery and a bottomed cap 90 is attached thereto.

The case 88 has an opening 91 at top end and an operating lever 92, which is a piercing member, is attached to the opening 91 to rotate up and down. The operating lever 92 is structured with a synthetic resin plate which has virtually the same width of the opening 91, one end has a protruded pin 93 which is slidably inserted to a long hole 94 formed on the case 88, and the other end is protruded from outside rear of the case 88.

In illustration, reference numeral 92*a* is an engaging convex portion which protruded in the center of the undersurface of the operating lever 92. It is disposed engageable to the top end of the control valve, which will be described later, and a safety pin 95 is inserted to the engaging convex portion 92*a*. Numeral 92*b* is a concaved finger grip portion which is formed on the other end of the operating lever 92 and protrudes backward from the case 88.

The safety pin 95 is inserted by penetrating the center of the operating lever 92 and the case 88. One end of the gasping portion (not shown), protrudes outside of the case 88, making impossible to press the operating lever 92 in normal times or to pierce the seal accidentally. When the safety pin 95 is pulled out by pulling the grasping portion (not shown), an operation of pressing the lever 92 can be performed.

The small gas cylinder 1 is stored inside of the case 88, with the bottom stored in the cap 90. The periphery of the gas cylinder 1 is formed with the thread part 4 and the thread part 4 is attached to the screw hole 7 of the cylinder holder 5 by screwing.

The cylinder holder 5 is formed in a shape of cylinder by aluminum die-casting. There is an opening for the screw hole 7 at the lower end and the through hole 8, a valve hole 96, and a hole 97 are disposed to communicate one another at the upper part of the thread hole 7. The respective inner diameters are formed to become smaller.

The middle to upper periphery of the cylinder holder 5 is provided with the jetting port 13 which communicates with the jetting port guide 31 formed on the case 88, and the bottom of the jetting port 13 is disposed with the nozzle hole 14, which communicates the valve hole 96.

The control valve 98 which is integrally formed with the piercing pipe 10 is slidably inserted to the valve hole 96, and the top end is disposed to appear on top of the cylinder holder 5. The top end is disposed engageable with the engaging convex portion 92*a* when it protrudes.

The needle tube 19 which is a piercing member is protruded from the lower end of the control valve 98, with the tip part 19*a* disposed immediately above the sealing plate 3. In this case, tubular structure is not necessarily required for the needle tube 19.

The control valve 98 is formed in a shape of stepped bar, and at least a pair of O-rings 99, 100 are mounted to the positions of upper and lower of the periphery of the large diameter part, enabling the valve hole 96 and the nozzle hole 14 to be air tightened by the O-rings 99, 100.

The spring 20 is inserted between the lower end of the control valve 98 and the sealing plate 3, and the resilience of the spring 20 biased the control valve 98 upwardly. The stepped portion 98*a* which is formed on the middle of the control valve 98 is able to be engaged with the rim of the lower opening of the hole 97.

The control valve 98 is, in normal times, able to close the nozzle hole 14 by positioning the O-ring 100, which is disposed lower side, at inner rim of the nozzle hole 14. When pressing the operation lever 92 and piercing the sealing plate 3, the long hole 94 controls the descending displacement of both the operating lever 92 and the control valve 98, and the O-ring 99, which is disposed upper side, is positioned at inner rim of the nozzle hole 14 to be able to close the nozzle hole 14.

Then, when jetting the extinguishing gas by pressing the operation lever 92 after the piercing, the O-rings 99, 100 are respectively positioned at inner rim of the nozzle hole 14, the lower O-ring 100 is positioned at the side of the through hole 8, and the nozzle hole 14 is communicated with the through hole 8 to be able to jet the extinguishing gas from the nozzle hole 14.

In illustration, reference numeral 101 shows a concaved part formed on the top of the cylinder holder 5, and a lever spring 102 is inserted between the concaved part 101 and the opening lever 92. The resilience of the spring 102 biased the operating lever 92 upwardly. Numeral 3*a* shows a sealed hole of the sealing plate 3.

In this embodiment, an outer housing, a piercing holder, a pin, and a pushrod, the parts to be disposed around the cylinder holder 5 in a conventional fire extinguisher gas ejector are omitted. Only the cylinder holder 5 is disposed upside of the case 88 so that the number of the parts are reduced and they are easily assembled. Thus, small and light structure and low cost of the fire extinguisher gas ejector can be achieved.

In addition, the control valve 98 of this embodiment requires only to form the annular groove which attaches two O-rings 99, 100 at the predetermined position of the periphery of the piercing pipe 10. Compared to the conventional control valve, the structure is simpler and the less number of the parts is required. Therefore, it is produced easily and inexpensively.

The fire extinguisher gas ejector is used as follows. The cap 90 is removed before use, the gas cylinder 1 is inserted from the bottom of the case 88, the thread part 4 of the mouth part is screwed to the screw hole 7 of the cylinder holder 5 to attach the gas cylinder 1, and the cap 90 is screwed to the lower end of the case 88.

In the fire extinguisher gas ejector of above mentioned, the O-ring 100 is positioned at inner rim of the nozzle hole 14 to close the rim and intermit the guide hole 8, valve hole 96, and the nozzle hole 14.

The resilience of the spring 20 biases the control calve 98 upwardly and the top end is protruded from the top of the cylinder holder 5 to engage with the engaging convex portion 92*a* of the operating lever 92.

The safety pin 95 is inserted to the operating lever 92 on the center, the pin 95 is engaged with the top end of the long hole 94 to stop an operation of the operating lever 92. Moreover, the needle tube 19 is located above the sealing plate 3 for the piercing operation. The state is shown in FIG. 26.

Next, when putting out a fire, the safety pin 95 is pulled out by pulling a grasping portion (not shown) and the operating lever 92 is unlocked, the operating lever 92 is pressed down the upper center against the resilience of the spring 20.

In this way, the operating lever 92 is descended horizontally through the pin 93 along with the long hole 94, the engaging convex portion 92*a* presses the top end of the piercing pipe 10 and pushes down the control valve 98 against the resilience of the valve spring 102.

Therefore, the needle tube 19 moves in accordance with the control valve 98, and the tip part 19*a* pierces the sealing plate 3. The state is shown in FIG. 27.

When piercing, the O-ring 99 moves to the inner rim of the nozzle hole 14 to close the nozzle hole 14 and intermit the nozzle hole 14 and the through hole 8.

Thus, if the extinguishing gas is jetted from the gas cylinder 1 by piercing and flowed to the through hole 8, the gas does not flow out from the nozzle hole 14.

After the piercing, when releasing a hand from the operating lever 92, the spring 20 pushes up the control valve 98 and the O-ring 100 is moved to the original position which shown in FIG. 26 to seal the nozzle hole 14. The operating lever 92 is pushed up engaged with the piercing pipe 10 and the pin 93 moves to the original position in FIG. 26 engaged with the top end of the long hole 94.

Accordingly, after the piercing, the extinguishing gas is jetted swiftly to the through hole 8 from the pierced hole 3*a* of the sealing plate 3. However, the O-ring 100 stops the outflow of the gas from the nozzle hole 14, and the O-ring 99 prevents the leakage from the valve hole 96 and the gas stagnates in the through hole 8.

Under the situation like the above-mentioned, a finger is put on a finger grip portion 92*b* and press the operating lever 92 down against the resilience of the lever spring 102. Then, the operating lever 92 rotates downward with the pin 93, which acts as a fulcrum, and the engaging convex portion 92*a* presses the piercing pipe 10 down.

Then, the O-ring 99, 100 moves lower, the O-ring 100 uncloses the nozzle hole 14 and moves to the upper part of the through hole 8, communicating the nozzle hole 14 with the through hole 8, and the O-ring 99 moves to immediate above the rim of the inner side of the nozzle hole 14 to seal the valve hole 96.

The state is shown in FIG. 28. The descending displacement of the piercing pipe 10 and the control valve 98 is less than when the seal is pierced. Therefore, the O-ring 99 does not close the nozzle hole 14, and the pierced hole 3*a* is not closed by inserting the needle tube 19. The nozzle hole 14 is remained open and the jetting of the extinguishing gas from the pierced hole 3*a* is remained.

Consequently, the extinguishing gas is jetted from the nozzle hole 14 to the jetting port 13 and jetted outside from the jetting guide 31 toward a fire origin.

As mentioned above, the control valve 98 in the embodiment, the extinguishing gas which is jetted after the piercing is once stagnated in the through hole 8. When the through hole 8 and the nozzle hole 14 are communicated with each other by the operation of the operating lever 92 after the seal is pierced, the extinguishing gas is accurately jetted to a fire origin.

Then, releasing a hand from the operating lever 92 when jetting the gas, the O-ring 100 seals the nozzle hole 14, as mentioned above, the jetting of the extinguishing gas is stopped, and the O-ring 99 stops the leakage from the valve hole 96 and the gas stagnates in the through hole 8. Accordingly, the unused extinguishing gas after the seal piercing is used effectively.

Accordingly, the fire extinguisher gas ejector of the present invention easily and quickly removes the safety member, pierce the seal of the small gas cylinder mounted therewith, and jet the gas promptly to attempt early fire extinction. This invention comprises the emergency escape mechanism from vehicle, which cuts a seat belt promptly and breaks the windshield surely in case such as a fire in vehicle and collision, and attempts a prompt escape from vehicle. Moreover, it does not require a device exclusive to escape. Mechanisms for fire extinction and escaping are rationally constituted. The hammer can be rationally and safely attached to the gas cylinder. The invention comprises the control valve which prevents the waste of the extinguishing gas and jets the fire extinguishing gas to the origin of a fire surely and accurately in fire fighting. Thus, the present invention is suitable for a fire extinguisher, for example, used in a vehicle.

What is claimed is:

1. A fire extinguisher gas ejector comprising:

a gas cylinder filled with extinguishing gas, sealed with a seal and provided with an exposed bottom and a mouth part removably attached thereto;

cylinder holder formed therein with a through hole and a nozzle hole;

a piercing pipe which is slidably mounted onto the cylinder holder, biased to upwardly move, and provided at one end thereof with a tip part capable of piercing the seal;

a piercing member associated with an operation of the other end of the piercing pipe;

a safety member capable of restraining an operation of the piercing pipe; and a hammer having a pointed part protruded from the exposed part of the bottom of the cylinder, wherein the hammer comprises a retainer ring attached to the exposed bottom of the gas cylinder, a hammer shaft that has a neck hooked to an inside of the retaining ring and the pointed part protruded from the retaining ring, and, whereby, the hammer is capable of breaking a windshield of a vehicle.

2. A fire extinguisher gas ejector comprising:

a gas cylinder filled with extinguishing gas, sealed with a seal and provided with an exposed bottom and a mouth part removably attached thereto;

a cylinder holder formed therein with a through hole and a nozzle hole;

a piercing pipe which is slidably mounted onto the cylinder holder, biased to upwardly move, and provided at one end thereof with a tip part capable of piercing the seal;

a piercing member coupling with the other end of the piercing pipe;

a safety member capable of restraining an operation of the piercing pipe; and a hammer having a pointed part and attached to the exposed bottom of the cylinder; and wherein the hammer comprises a retaining ring attached to the exposed bottom of the gas cylinder and a hammer shaft that has a neck hooked to an inside of the retaining ring and the pointed part protruded outside the retaining ring.

3. A fire extinguisher gas ejector according to claim 2, wherein after the retaining ring is attached to the gas cylinder, the retaining ring and the gas cylinder are plated.

4. A fire extinguisher gas ejector according to claim 2, wherein the neck of the hammer shaft has an elastic stopper mounted thereon, and the stopper is arranged to engage with an inner opening of the retaining ring.

5. A fire extinguisher gas ejector according to claim 1, further comprising an outer shell provided outside the cylinder holder, a seat belt introduction groove provided in a periphery of the outer shell and capable of inserting a seat belt therein, and a cutter arranged to face the seat belt introduction groove.

6. A fire extinguisher gas ejector according to claim 5, wherein the seat belt introduction groove is arranged on a side opposite to a side of the nozzle hole and on the periphery of the outer shell, and extends in an up and down direction and obliquely.

7. A fire extinguisher gas ejector according to claim 5, further comprising a seat belt releasing part disposed at a top end of the seat belt introduction groove, and disposed above the cutter with a space.

8. A fire extinguisher gas ejector according to claim 7, wherein the seat belt releasing part is integrally formed with the outer shell.

9. A fire extinguisher gas ejector according to claim 7, wherein the seat belt releasing part has a substantially inverted triangular cross-section taken along a direction of introducing the seat belt in the seat belt introduction groove.

10. A fire extinguisher gas ejector according to claim 7, wherein the seat belt releasing part is provided in a vicinity of a rear of the cutter and has a distal end insertable in a cut part of the seat belt, and releasing surfaces formed on opposite sides thereof to continue with the distal end for spreading and moving the cut part of the seat belt.

11. A fire extinguisher gas ejector according to claim 5, wherein the outer shell is provided on a lower periphery thereof with curved concaved parts disposed apart from an upper periphery of the gas cylinder.

12. A fire extinguisher gas ejector according to claim 11, wherein the curved concave parts are disposed on front and back sides of the lower periphery of the outer shell and have a plurality of concavo-convex parts.

13. A fire extinguisher gas ejector comprising:

a gas cylinder filled with extinguishing gas, sealed with a seal and provided with an exposed bottom and a mouth part removably attached thereto;

a cylinder holder formed therein with a through hole and a nozzle hole;

a piercing pipe which is slidably mounted onto the cylinder holder, biased to upwardly move, and provided at one end thereof with a tip part capable of piercing the seal;

a piercing member coupling with the other end of the piercing pipe;

a safety member capable of restraining an operation of the piercing pipe;

a hammer having a pointed part and attached to the exposed bottom of the cylinder;

an outer shell provided outside the cylinder holder, a seat belt introduction groove provided in a periphery of the outer shell and capable of inserting a seat belt therein, and a cutter arranged to face the seat belt introduction groove, wherein the outer shell is provided on a lower periphery thereof with curved concaved parts disposed apart from an upper periphery of the gas cylinder; and a piercing device loaded with the gas cylinder, a storing case accommodated in a door pocket of a car for storing the piercing device, a strap having opposite ends thereof attached to a periphery of the storing case, a middle part thereof provided with a stopper that is detachably attached to an engaging part buried in an outer surface of the door pocket, and a leading end thereof stuck out to face a driver side.

14. A fire extinguisher gas ejector comprising:

a gas cylinder filled with extinguishing gas, sealed with a seal and provided with an exposed bottom and a mouth part removably attached thereto;

a cylinder holder formed therein with a through hole and a nozzle hole;

a piercing pipe which is slidably mounted onto the cylinder holder, biased to upwardly move, and provided at one end thereof with a tip part capable of piercing the seal;

a piercing member coupling with the other end of the piercing pipe;

a safety member capable of restraining an operation of the piercingpipe;

a hammer having a pointed part and attached to the exposed bottom of the cylinder;

an outer shell provided outside the cylinder holder, a seat belt introduction groove provided in a periphery of the outer shell and capable of inserting a seat belt therein, and a cutter arranged to face the seat belt introduction groove, wherein the outer shell is provided on a lower periphery thereof with curved concaved parts disposed apart from an upper periphery of the gas cylinder; and a piercing device loaded with the gas cylinder and a protective case installed at an appropriate place in a car for storing the piercing device and formed with upper and lower opening facing in opposite directions, wherein the seat belt introduction groove and piercing member emerge at the upper opening, whereas a periphery of the gas cylinder emerges at the lower opening.

15. A fire extinguisher gas ejector according to claim 1, wherein the retaining ring has a hole and is welded to the exposed bottom of the gas cylinder, the hole has a tapered surface in an inner rim, the hammer shaft is insertable into the hole, the hammer shaft has an annular neck portion on a base part thereof, an elastic stopper is mounted on the neck, the hammer shaft and the stopper are disposed inside the hole and the stopper is engaged with the tapered surface.

16. A fire extinguisher gas ejector according to claim 15, wherein the retaining ring is attached to the bottom of the gas cylinder by welding after the gas cylinder is filled with carbon dioxide having a predetermined pressure and a mouth part of the gas cylinder is sealed with a sealing plate.

17. A fire extinguisher gas ejector according to claim 15, wherein an adhesive is applied in a space of the bottom of the gas cylinder, the stopper, and the hammer shaft, and hardened.

18. A fire extinguisher gas ejector according to claim 1, wherein after the retaining ring is attached to the exposed bottom of the gas cylinder, the retaining ring and the gas cylinder are plated.

19. A fire extinguisher gas ejector according to claim 18, wherein after the retaining ring is attached to the exposed bottom of the gas cylinder by welding, the gas cylinder and the retaining ring are plated at a time.

20. A fire extinguisher gas ejector according to claim 11, further comprising a piercing device loaded with the gas cylinder, a storing case accommodated in a door pocket of a car for storing the piercing device, a strap having opposite ends thereof attached to a periphery of the storing case, a middle part thereof provided with a stopper that is detachably attached to an engaging part buried in an outer surface of the door pocket, and a leading end thereof stuck out to face a driver side.

21. A fire extinguisher gas ejector according to claim 11, further comprising a protective case installed at an appropriate place in a vehicle compartment and formed with upper and lower openings facing in opposite directions, wherein the seat belt introduction groove and the piercing member emerge at the upper opening, whereas a periphery of the gas cylinder emerges at the lower opening.

22. A fire extinguisher gas ejector according to claim 1, wherein the piercing member is connected to a top end of the piercing pipe, the piercing member is provided on a top end of an outer shell and movable up and down, and the safety member is removably provided between the piercing member and the outer shell.

23. A fire extinguisher gas ejector according to claim 22, wherein the safety member is formed in a plate shape, and is formed with a notch engageable with the top end of the piercing pipe.

24. A fire extinguisher gas ejector according to claim 22, wherein the safety member is provided at an end thereof with a protruding connecting part, and a ring-shaped tab is connected to the connecting part and can be raised with a finger.

* * * * *